United States Patent
Higashiyama

(10) Patent No.: US 7,886,811 B2
(45) Date of Patent: Feb. 15, 2011

(54) EVAPORATOR AND PROCESS FOR FABRICATING SAME

(75) Inventor: Naohisa Higashiyama, Oyama (JP)

(73) Assignee: Showa Denko K.K., Tokyo (JP)

( * ) Notice: Subject to any disclaimer, the term of this patent is extended or adjusted under 35 U.S.C. 154(b) by 1193 days.

(21) Appl. No.: 10/579,470

(22) PCT Filed: Nov. 15, 2004

(86) PCT No.: PCT/JP2004/017308

§ 371 (c)(1),
(2), (4) Date: May 15, 2006

(87) PCT Pub. No.: WO2005/047800

PCT Pub. Date: May 26, 2005

(65) Prior Publication Data

US 2007/0084594 A1    Apr. 19, 2007

Related U.S. Application Data

(60) Provisional application No. 60/523,101, filed on Nov. 19, 2003.

(30) Foreign Application Priority Data

Nov. 14, 2003   (JP) .............................. 2003-385441

(51) Int. Cl.
*F28F 9/02* (2006.01)
(52) U.S. Cl. .......................... 165/173; 165/175; 62/515; 62/525
(58) Field of Classification Search ................. 165/172, 165/173, 174, 175, 176; 62/515, 525
See application file for complete search history.

(56) References Cited

U.S. PATENT DOCUMENTS

| 6,199,401 | B1 * | 3/2001 | Haussmann ................. 165/174 |
| 7,673,670 | B2 * | 3/2010 | Higashiyama et al. ...... 165/176 |
| 2005/0172664 | A1 * | 8/2005 | Cho et al. .................... 165/175 |
| 2006/0086486 | A1 * | 4/2006 | Sudo ............................ 62/515 |
| 2006/0162376 | A1 * | 7/2006 | Higashiyama et al. ......... 62/525 |
| 2006/0213651 | A1 * | 9/2006 | Higashiyama et al. ...... 165/174 |
| 2007/0074861 | A1 * | 4/2007 | Higashiyama ............... 165/176 |

FOREIGN PATENT DOCUMENTS

| JP | 10-339586 | 12/1998 |
| JP | 2001-241881 | 9/2001 |
| JP | 2003-075024 | 3/2003 |

* cited by examiner

*Primary Examiner*—Ljiljana (Lil) V Ciric
(74) *Attorney, Agent, or Firm*—Oblon, Spivak, McClelland, Maier & Neustadt, L.L.P.

(57) ABSTRACT

An evaporator includes a refrigerant inlet header and a refrigerant outlet header arranged side by side in a front-rear direction, and a refrigerant circulating passage holding the headers in communication. The inlet and outlet headers are provided with caps forming refrigerant inlet and refrigerant outlet, the caps are joined to a pipe joint member having refrigerant inlet and outlet portions in communication with the refrigerant inlet and outlet, the caps or the pipe joint member is provided with a positioning lug which is projecting from its side edge toward the other one and which is fitted with a positioning recess formed in the other one, and the caps and the pipe joint member have flat surfaces to be contact with each other and are brazed such that the lug is engaged with the recess and that the flat surfaces are in contact with each other.

10 Claims, 13 Drawing Sheets

EVAPORATOR AND PROCESS FOR FABRICATING SAME

CROSS REFERENCE TO RELATED APPLICATION

This application is an application filed under 35 U.S.C. §111(a) claiming the benefit pursuant to 35 U.S.C. §119(e)(1) of the filing date of Provisional Application No. 60/523,101 filed Nov. 19, 2003 pursuant to 35 U.S.C. §111(b).

TECHNICAL FIELD

The present invention relates to evaporators for use in motor vehicle air conditioners which are refrigeration cycles to be installed in motor vehicles.

The term "aluminum" as used herein and in the appended claims includes aluminum alloys in addition to pure aluminum. The downstream side (the direction indicated by the arrow X in FIG. 1, and the right-hand side of FIG. 4) of the air to be passed through the air flow clearance between each adjacent pair of heat exchange tubes will be referred to herein and in the appended claims as "front," and the opposite side as "rear." Further the upper, lower, and left- and right-hand sides of FIG. 2 will be referred to as "upper," "lower," "left" and "right," respectively.

BACKGROUND ART

Evaporators of the stacked plate type are already known which comprise a plurality of flat hollow bodies arranged in parallel and each composed of a pair of dishlike plates facing toward each other and brazed to each other along peripheral edges thereof, a refrigerant inlet header and a refrigerant outlet header which are arranged in the front-rear direction, a refrigerant turn portion disposed as spaced from the two headers, a plurality of forward refrigerant passage portions for holding the inlet header in communication with the turn portion therethrough, and a plurality of backward refrigerant passage portions for holding the outlet header in communication with the turn portion, the inlet header having a refrigerant inlet at one end thereof, the outlet header having a refrigerant outlet at one end thereof alongside the inlet end, a refrigerant being permitted to flow from the inlet into the inlet header, then to flow through the forward passage portions into the turn portion where the refrigerant changes its course, thereafter to flow through the backward passage portions into the outlet header so as to be sent out from the outlet, a pipe joint plate being joined to both the inlet header and the outlet header and having a refrigerant inlet portion in the form of a short tube and communicating with the inlet and a refrigerant outlet portion in the form of a short tube and communicating with the outlet, a refrigerant inlet pipe having an end inserted in and joined to the inlet portion a refrigerant outlet pipe being larger than the inlet pipe in diameter and having a constricted end portion inserted in and joined to the outlet portion (see, for example, the publication of JP-A No. 2001-241881).

The inlet pipe of such evaporators is usually smaller than the outlet pipe in diameter. With the evaporator disclosed in the above publication, therefore, the refrigerant inflow portion is so dimensioned that the inlet pipe can be inserted thereinto without constriction, while the refrigerant outflow portion is given the same size as the inflow portion, such that the constricted end portion of the outlet pipe can be inserted into the outflow portion.

In recent years, however, it has been demanded to provide evaporators further reduced in size and weight and exhibiting higher performance. To meet such a demand, an evaporator has been proposed which comprises a refrigerant inlet header and a refrigerant outlet header which are arranged in the front-rear direction, and a refrigerant circulating passage for holding the two headers in communication with each other, the circulating passage comprising two intermediate headers and a plurality of heat exchange tubes, the inlet header being opposed to one of the intermediate headers, the outlet header being opposed to the other intermediate header, a group of heat exchange tubes arranged at a spacing and in the form of at least one row disposed between each opposed pair of headers, the heat exchange tubes in the group having opposite ends joined to the opposed pair of headers respectively, the inlet header having a refrigerant inlet at one end thereof, the outlet header having a refrigerant outlet at one end thereof alongside the inlet end, a refrigerant being permitted to flow from the inlet into the inlet header and to return to the outlet header through the circulating passage so as to be sent out of the outlet (see the publication of JP-A No. 2003-214794).

Also in the case of the evaporator disclosed in the publication of JP-A No. 2003-214794, a refrigerant inlet pipe and a refrigerant outlet pipe need to be joined to the inlet header and the outlet header, respectively, so that the evaporator has a refrigerant inlet-outlet block which is brazed to both the inlet header and the outlet header and provided with a refrigerant inflow portion communicating with the inlet and a refrigerant outflow portion communicating with the outlet. However, the inlet-outlet block has a relatively great thermal capacity, and is therefore lower in brazeability, rendering the evaporator cumbersome to fabricate.

Accordingly, it is readily conceivable to braze the pipe joint plate disclosed in the publication of JP-A No. 2001-241881 to both the inlet header and the outlet header of the evaporator disclosed in the publication of JP-A No. 2003-214794, with an end of a refrigerant inlet pipe inserted in and joined to the inlet portion of the joint plate and with a constricted end portion of a refrigerant outlet pipe, having a larger diameter than the inlet pipe, inserted in and joined to the outlet portion of the joint plate. In this case, however, the evaporator has a reduced size in the front-rear direction, and the pipe joint plate therefore needs to be smaller in length in the front-rear direction, for example, up to 50 mm. If the pipe joint plate has a reduced length, e.g., up to 50 mm, in the front-rear direction, the following problem arises since the inlet portion and the outlet portion provided on the joint plate are equal in outside diameter. The inlet portion and the outlet portion of the pipe joint plate are joined to the inlet pipe and the outlet pipe usually by high-frequency brazing using a high-frequency heating coil provided around these inlet and outlet portions, whereas if the pipe joint plate is restricted in the front-rear dimension, provision of the inlet and outlet portions of approximately the same outside diameter results in a reduced spacing between the inlet and outlet portions, presenting difficulty in fitting the high-frequency heating coil around these portions, making it impossible to automatically carry out the brazing operation and necessitating cumbersome fabrication work. Furthermore, the reduced spacing between the inlet portion and the outlet portion diminishes the area of brazing joint of the joint plate portion between the inlet and outlet portions and the inlet header or the outlet header, and a faulty joint is likely to occur. When the brazing joint is faulty, short-circuiting will occur between the inlet header and the outlet header, consequently permitting the refrigerant flowing in through the inlet pipe to flow into the outlet pipe without passing through the heat exchange tubes and failing to contribute to cooling to any extent to entail seriously impaired cooling performance.

An object of the present invention is to overcome the above problems and to provide an evaporator which can be fabricated relatively easily and wherein the short-circuiting between the inlet header and the outlet header can be prevented.

DISCLOSURE OF THE INVENTION

According to one embodiment of the present invention, an evaporator has a refrigerant inlet header and a refrigerant outlet header arranged side by side in a front-rear direction, and a refrigerant circulating passage for holding the two headers in communication with each other therethrough, the inlet header having a refrigerant inlet at one end thereof, the outlet header having a refrigerant outlet at one end thereof alongside the inlet end, a refrigerant being permitted to flow from the refrigerant inlet into the inlet header and to return to the outlet header through the circulating passage so as to be sent out from the refrigerant outlet, the inlet header and the outlet header being closed with respective caps each at said one end thereof, the refrigerant inlet being formed in the cap of the inlet header, the refrigerant outlet being formed in the cap of the outlet header, a platelike pipe joint member having a refrigerant inlet portion in communication with the refrigerant inlet and a refrigerant outlet portion in communication with the refrigerant outlet and being joined to both the caps of the inlet header and the outlet header.

According to another embodiment of the present invention, the refrigerant inlet portion and the refrigerant outlet portion of the pipe joint member are each in the form of a short tube, a refrigerant inlet pipe having a constricted end portion inserted in and joined to the refrigerant inlet portion, a refrigerant outlet pipe having an end portion inserted in and joined to the refrigerant outlet portion.

According to another embodiment of the present invention, the refrigerant inlet portion is smaller than the refrigerant outlet portion in outside diameter.

According to another embodiment of the present invention, the refrigerant outlet pipe is provided at said end portion with a constricted portion inserted in and joined to the refrigerant outlet portion.

According to another embodiment of the present invention, one of the cap and the pipe joint member is provided with a positioning lug projecting toward the other, and the other is provided with a positioning recess for the lug to fit in.

According to another embodiment of the present invention, the caps are in the form of an integral piece.

According to another embodiment of the present invention, the inlet header and the outlet header have a first member forming portions of the two headers adjacent to the circulating passage and a second member forming the remaining portions of the two headers and brazed to the first member, whereby the two headers are made integral with each other, each of the caps having engaging lugs engageable with the first member and the second member respectively.

According to another embodiment of the present invention, an evaporator has a heat exchange core composed of tube groups in the form of rows arranged in a front-rear direction, each of the tube groups having heat exchange tubes arranged at a spacing in a left-right direction, a refrigerant inlet header positioned toward one end of each heat exchange tube and having joined thereto the heat exchange tubes of the tube group of at least one row, a refrigerant outlet header disposed toward said one end of each heat exchange tube and positioned forwardly or rearwardly of the inlet header, the outlet header having joined thereto the heat exchange tubes of the tube group of at least one row, a refrigerant inflow header positioned toward the other end of each heat exchange tube and having joined thereto the heat exchange tubes joined to the inlet header, and a refrigerant outflow header positioned toward said other end of each heat exchange tube and having joined thereto the heat exchange tubes joined to the outlet header, the inflow header and the outflow header being in communication with each other to provide a refrigerant turn portion, the inlet header and the outlet header being closed with respective caps each at one end thereof, the cap of the inlet header having a refrigerant inlet, the cap of the outlet header having a refrigerant outlet, a platelike pipe joint member having a refrigerant inlet portion in communication with the refrigerant inlet and a refrigerant outlet portion in communication with the refrigerant outlet and being joined to both the caps of the inlet header and the outlet header.

According to another embodiment of the present invention, the refrigerant inlet portion and the refrigerant outlet portion of the pipe joint member are each in the form of a short tube, a refrigerant inlet pipe having a constricted end portion inserted in and joined to the refrigerant inlet portion, a refrigerant outlet pipe having an end portion inserted in and joined to the refrigerant outlet portion.

According to another embodiment of the present invention, the refrigerant inlet portion is smaller than the refrigerant outlet portion in outside diameter.

According to another embodiment of the present invention, the refrigerant outlet pipe is provided at said end portion with a constricted portion inserted in and joined to the refrigerant outlet portion.

According to another embodiment of the present invention, one of the cap and the pipe joint member is provided with a positioning lug projecting toward the other, and the other is provided with a positioning recess for the lug to fit in.

According to another embodiment of the present invention, the pipe joint member is provided with a positioning lug projecting toward the cap, and the cap is provided with a positioning recess for the lug to fit in, the inlet header and the outlet header being closed with respective blind caps each at the other end thereof, the blind caps not having the positioning recess formed in the cap.

According to another embodiment of the present invention, the inlet header and the outlet header comprise a first member having the heat exchange tubes joined thereto, and a second member joined to the first member at a portion thereof opposite to the heat exchange tubes, whereby the inlet and outlet headers are made integral with each other, each of the caps and the blind caps having engaging lugs engageable with the first member and the second member respectively.

According to another embodiment of the present invention, the inlet header and the outlet header are provided by dividing interior of a single refrigerant inlet-outlet tank into a front and a rear portion by a partitioning device.

According to another embodiment of the present invention, interior of the outlet header is divided by a separating device into first and second two spaces arranged in the direction of height, and the heat exchange tubes joined to the outlet header extend into the first space, the second space of the outlet header being in communication with the refrigerant outlet.

According to another embodiment of the present invention, the partitioning device and the separating device are integral with the second member.

According to another embodiment of the present invention, the caps, as well as the blind caps, are made integral with each other, and the caps, as well as the blind caps, have a first protrusion fitting in the inlet header, a second protrusion fitting in the first space of the outlet header and a third protrusion fitting in the second space of the outlet header, the first protrusion of the caps being provided with the refrigerant inlet, the third protrusion of the caps being provided with the refrigerant outlet.

According to another embodiment of the present invention, a process for fabricating an evaporator includes forming a refrigerant inlet header and a refrigerant outlet header arranged side by side in a front-rear direction, and a refrigerant circulating passage for holding the two headers in communication with each other therethrough, joining a cap having a refrigerant inlet to one end of the inlet header and a cap having a refrigerant outlet to one end of the outlet header, joining a platelike pipe joint member having a refrigerant inlet portion in the form of a short tube and to be in communication with the inlet and a refrigerant outlet portion in the form of a short tube and to be in communication with the outlet to both the caps of the inlet header and the outlet header, thereafter inserting a constricted end portion of a refrigerant inlet pipe into the inlet portion of the pipe joint member and an end portion of a refrigerant outlet pipe into the outlet portion of the pipe joint member, and brazing the inlet portion and the outlet portion of the pipe joint member to the inlet pipe and the outlet pipe respectively at the same time using a high-frequency heating coil in the form of a spectacle-shaped assembly of two annular portions, with one of the annular portions positioned around the inlet portion of the pipe joint member and the other annular portion positioned around the outlet portion thereof.

According to another embodiment of the present invention, the process further includes making a heat exchange core composed of tube groups in the form of rows arranged in a front-rear direction, each of the tube groups having heat exchange tubes arranged at a spacing in a left-right direction, a refrigerant inlet header positioned toward one end of each heat exchange tube and having joined thereto the heat exchange tubes of the tube group of at least one row, a refrigerant outlet header disposed toward said one end of each heat exchange tube and positioned forwardly or rearwardly of the inlet header, the outlet header having joined thereto the heat exchange tubes of the tube group of at least one row, a refrigerant inflow header positioned toward the other end of each heat exchange tube and having joined thereto the heat exchange tubes joined to the inlet header, and a refrigerant outflow header positioned toward said other end of each heat exchange tube and having joined thereto the heat exchange tubes joined to the outlet header by collectively brazing the components, conducting a brazing operation simultaneously with the collective brazing step to braze a cap having a refrigerant inlet to one end of the inlet header and a cap having a refrigerant outlet to one end of the outlet header, to braze blind caps respectively to the other ends of the inlet header and the outlet header, and to braze a pipe joint member having a refrigerant inlet portion in the form of a short tube and to be in communication with the inlet and a refrigerant outlet portion in the form of a short tube and to be in communication with the outlet to both the caps of the inlet header and the outlet header, thereafter inserting a constricted end portion of a refrigerant inlet pipe into the inlet portion of the pipe joint member and an end portion of a refrigerant outlet pipe into the outlet portion of the pipe joint member, and brazing the inlet portion and the outlet portion of the pipe joint member to the inlet pipe and the outlet pipe respectively at the same time using a high-frequency heating coil in the form of a spectacle-shaped assembly of two annular portions, with one of the annular portions positioned around the inlet portion of the pipe joint member and the other annular portion positioned around the outlet portion thereof.

According to another embodiment of the present invention, a refrigeration cycle includes a compressor, a condenser and one of the evaporators described above.

According to another embodiment of the present invention, a vehicle having installed therein the refrigeration cycle as a motor vehicle air conditioner.

With the evaporators, the inlet header and the outlet header are closed with respective caps each at one end thereof, the cap of the inlet header has a refrigerant inlet, the cap of the outlet header has a refrigerant outlet, and the platelike pipe joint member has a refrigerant inlet portion communicating with the inlet and a refrigerant outlet portion communicating with the outlet and is positioned transversely of and joined to both the inlet header and the outlet header. Accordingly, the pipe joint member has a relatively small thermal capacity, and can be brazed to the inlet header and the outlet header more effectively to ensure facilitated work in fabricating the entire evaporator.

With the evaporators, the refrigerant inlet portion and the refrigerant outlet portion of the pipe joint member are each in the form of a short tube, and the constricted end portion of the inlet pipe is inserted in and joined to the inlet portion. The inlet portion can therefore be given a reduced outside diameter, consequently providing a relatively great spacing between the inlet portion and the outlet portion. The end portion of the inlet pipe which usually has a small diameter in evaporators is further constricted, and the constricted end portion is inserted into the inlet portion, so that the inlet portion can be considerably diminished in outside diameter. This provides a relatively great spacing between the inlet portion and the outlet portion. Accordingly, even in the case where the pipe joint member is restricted in front-rear dimension, a high-frequency heating coil can be easily provided around the inlet portion and the outlet portion to ensure an automatic brazing operation and facilitated work in fabricating the entire evaporator. A relatively large spacing provided between the inlet portion and the outlet portion permits the pipe joint portion between the inlet and outlet portions to be joined to the inlet header and to the outlet header over increased areas to prevent the occurrence of a faulty joint, further precluding short-circuiting between the inlet header and the outlet header. This eliminates the likelihood that the refrigerant flowing into the inlet header via the inlet pipe will flow out of the outlet header into the outlet pipe without passing through the refrigerant circulating passage or through the heat exchange tubes, preventing the impairment of cooling performance of the evaporator. With the end portion of the inlet pipe constricted, the refrigerant flows from the inlet pipe into the inlet header at an increased velocity so as to spread to the other end of the inlet pipe. In the case of the evaporator, the refrigerant is caused to flow as uniformly divided through all refrigerant circulating channels and is therefore allowed to flow through the channels in uniformalized quantities for the evaporator to exhibit improved cooling performance. If the refrigerant flows at a low velocity, the refrigerant flows into circulating channels at a position close to the refrigerant inlet in a greater amount than when flowing into circulating channels at a position away from the inlet, with the result that the refrigerant flows through all the circulating channels in uneven quantities to lower the cooling performance of the evaporator. This phenomenon becomes pronounced when the flow rate of the refrigerant is small. With the evaporator, the refrigerant flows as uniformly dividedly into all the heat exchange tubes joined to the inlet header, enabling the evaporator to achieve an improved cooling efficiency. At a low flow rate, the refrigerant flows into heat exchange tubes positioned close to the inlet in a larger quantity than when flowing into heat exchange tubes positioned away from the inlet, consequently flowing through all tubes in uneven quantities. This becomes pronounced when the flow rate of the refrigerant is low.

With evaporators, a further increased spacing can be provided between the inlet portion and the outlet portion of the pipe joint member.

In the case of the evaporators, the outlet portion can be given a reduced outside diameter, providing a further increased spacing between the inlet portion and outlet portion of the pipe joint member.

When fabricating the evaporators, the cap and the pipe joint member can be positioned in place accurately.

With the evaporator, the caps can be handled with ease.

When the components are tacked in combination in fabricating the evaporator, the first member and the second member can be tacked utilizing the engaging lugs on the caps. This results in an improved work efficiency.

When the components are tacked in combination in fabricating the evaporator, the blind caps can be prevented from being arranged at the end location of the inlet header and the outlet header where the pipe joint member is to be joined. If the blind caps are arranged at the location where the pipe joint member is to be joined, the positioning lugs of the pipe joint member will interfere with the blind caps and can not be positioned in place. This prevents the blind caps from being arranged at the wrong location.

When the components are tacked in combination in fabricating the evaporator, the first member and the second member can be tacked utilizing the engaging lugs on the caps and the blind caps. This results in an improved work efficiency.

The evaporator can be reduced in the number of components needed for fabricating the evaporator in its entirety.

With the evaporator, the separating device functions to enable the refrigerant to flow through all the heat exchange tubes joined to the inlet header in further uniformalized quantities and to flow also through all the heat exchange tubes joined to the outlet header in uniformalized quantities for the evaporator to exhibit further improved cooling performance.

With the evaporator, the partitioning device and the separating device of the inlet-outlet tank are integral with the second member and can therefore be provided easily.

In the processes for fabricating evaporators, the inlet pipe and the outlet pipe can be brazed to the inlet portion and the outlet portion of the pipe joint member at the same time. The evaporators can therefore be fabricated relatively easily.

BEST MODE OF CARRYING OUT THE INVENTION

Embodiments of the present invention will be described below with reference to the drawings.

Figure 1:
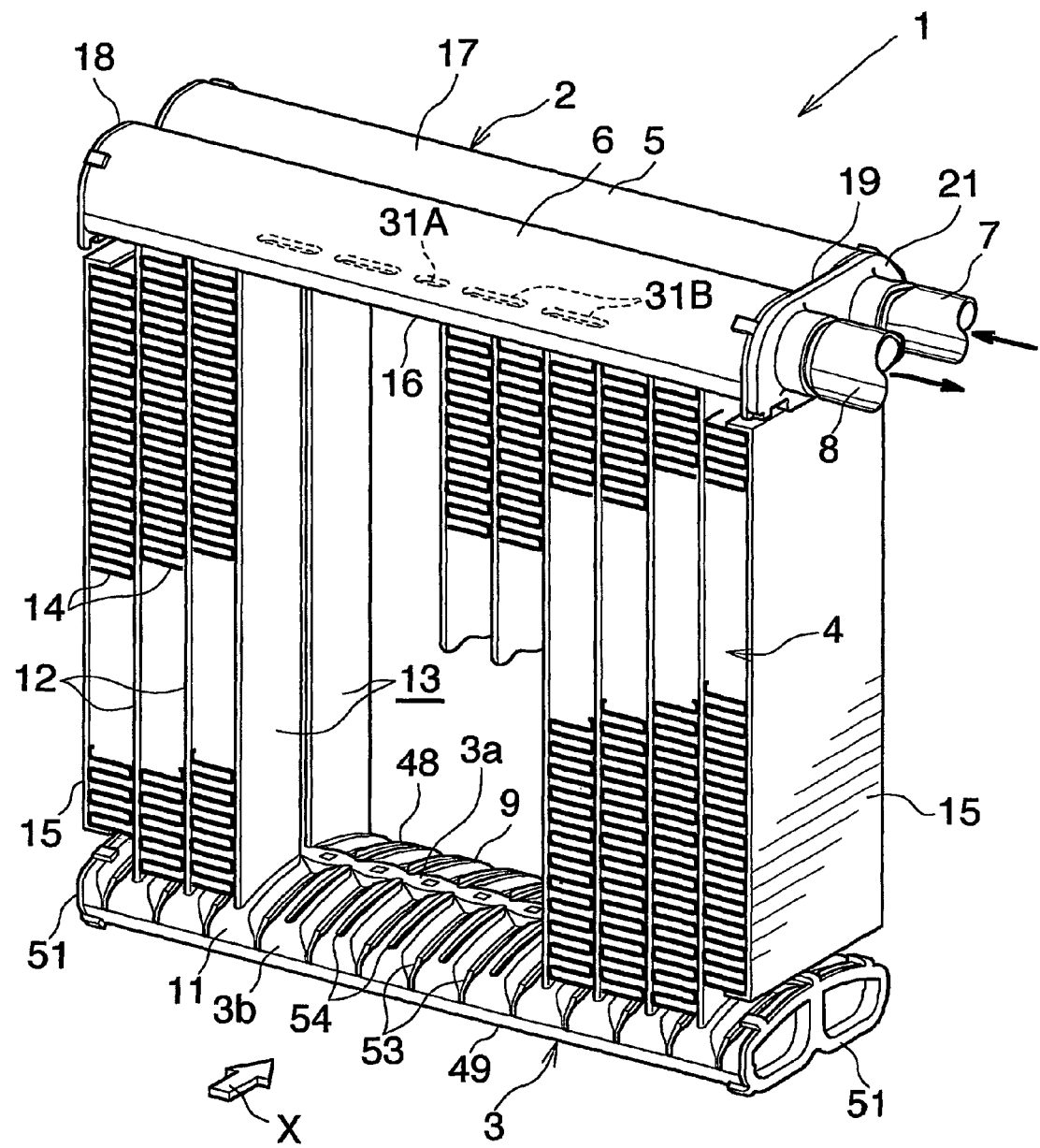
FIG. 1 is a perspective view partly broken away and showing the overall construction of an evaporator according to the invention.
Figure 2:
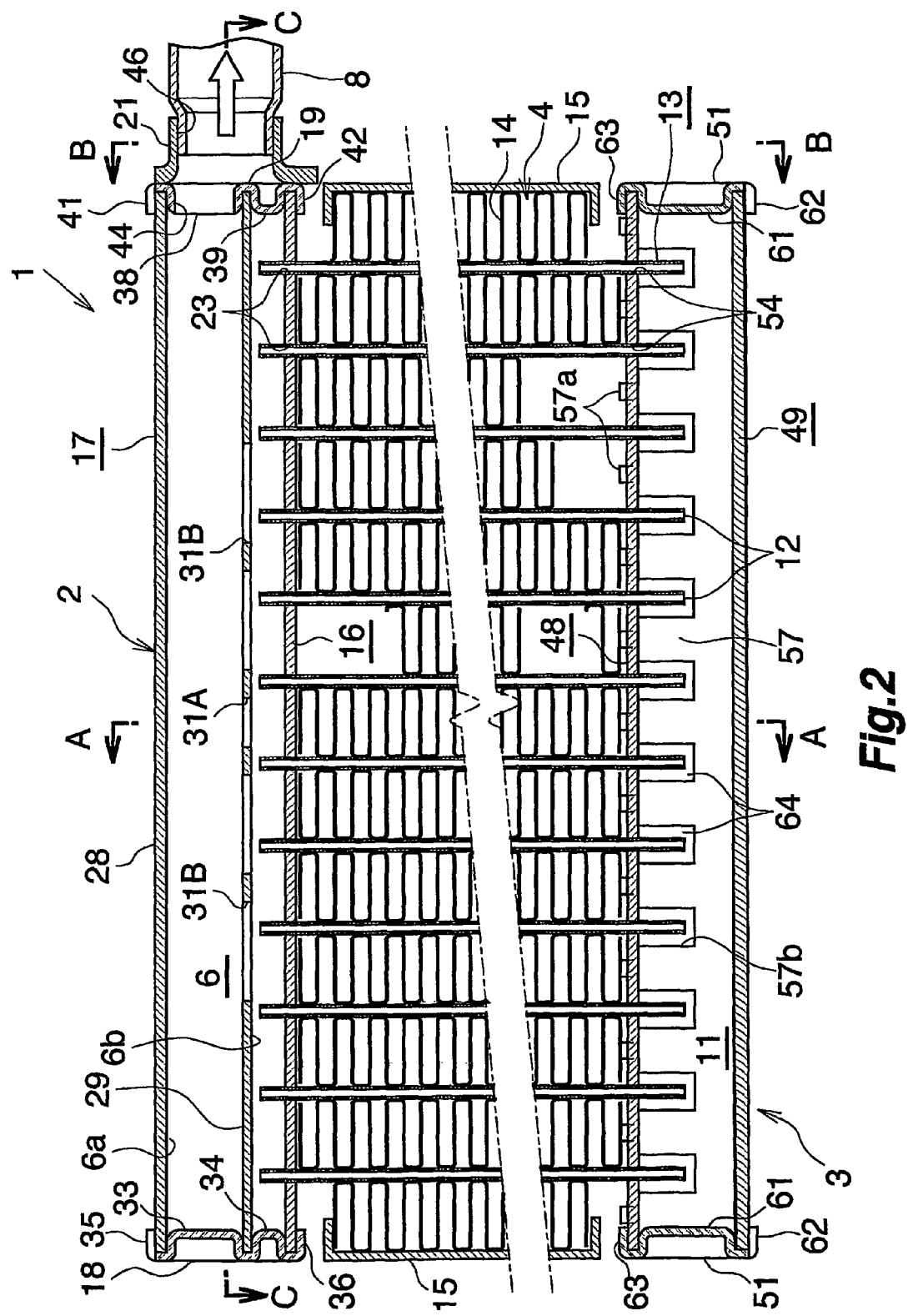
FIG. 2 is a fragmentary view in vertical section and showing the evaporator of FIG. 1 as it is seen from behind.
Figure 3:
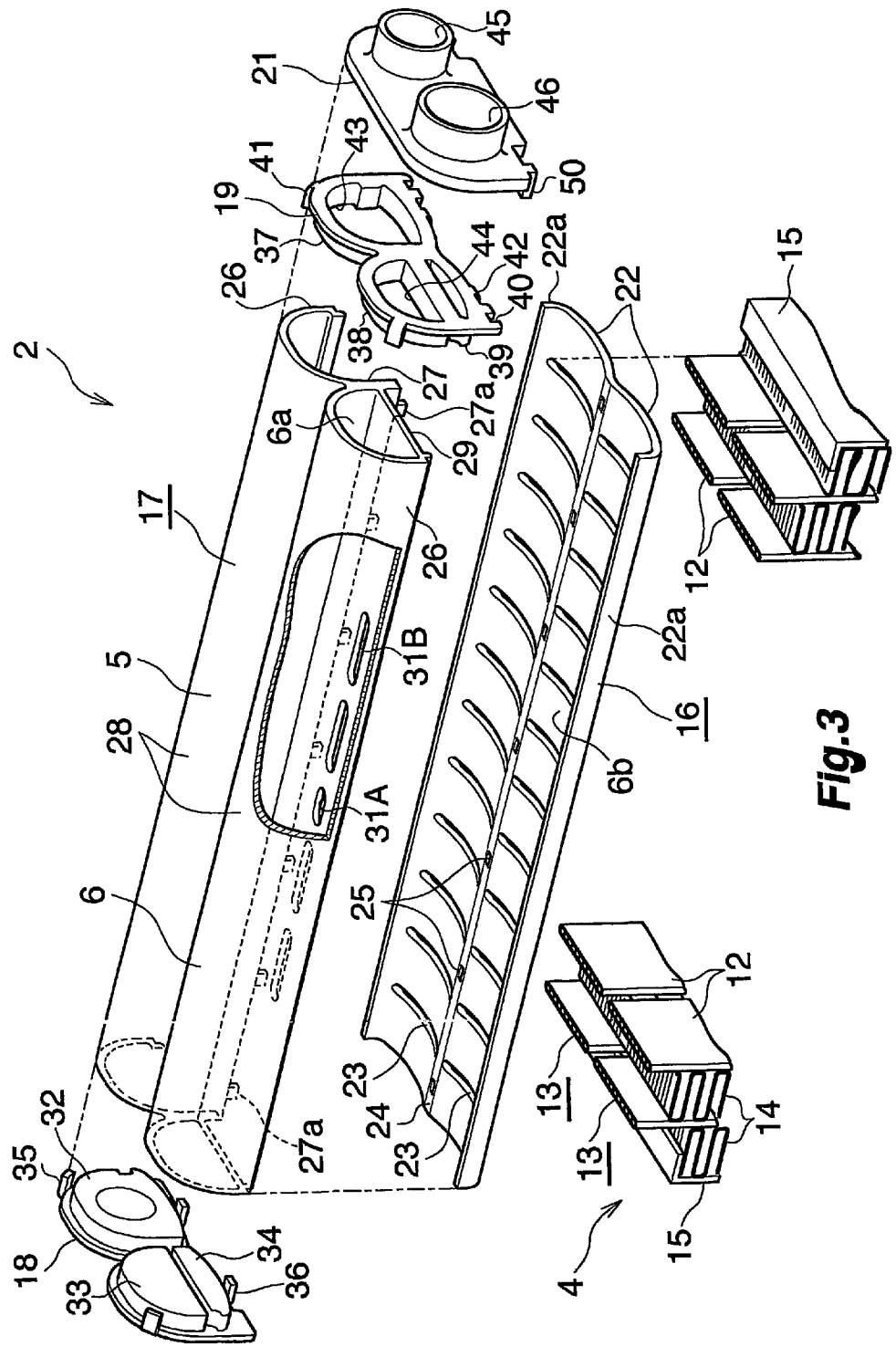
FIG. 3 is an exploded perspective view of a refrigerant inlet-outlet tank of the evaporator shown in FIG. 1.
Figure 9:
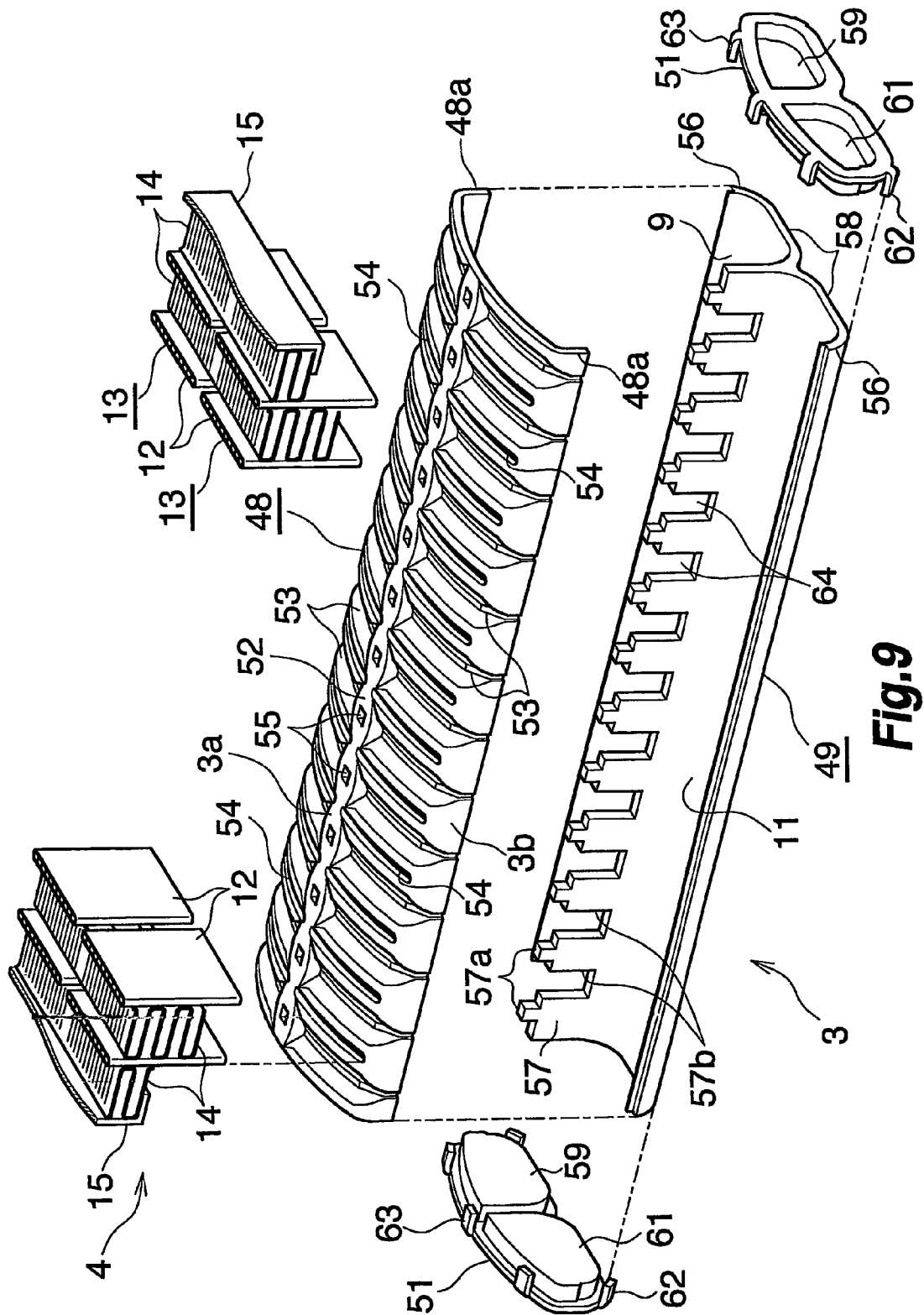
FIG. 9 is an exploded perspective view of a refrigerant turn tank of the evaporator shown in FIG. 1.
Figure 10:
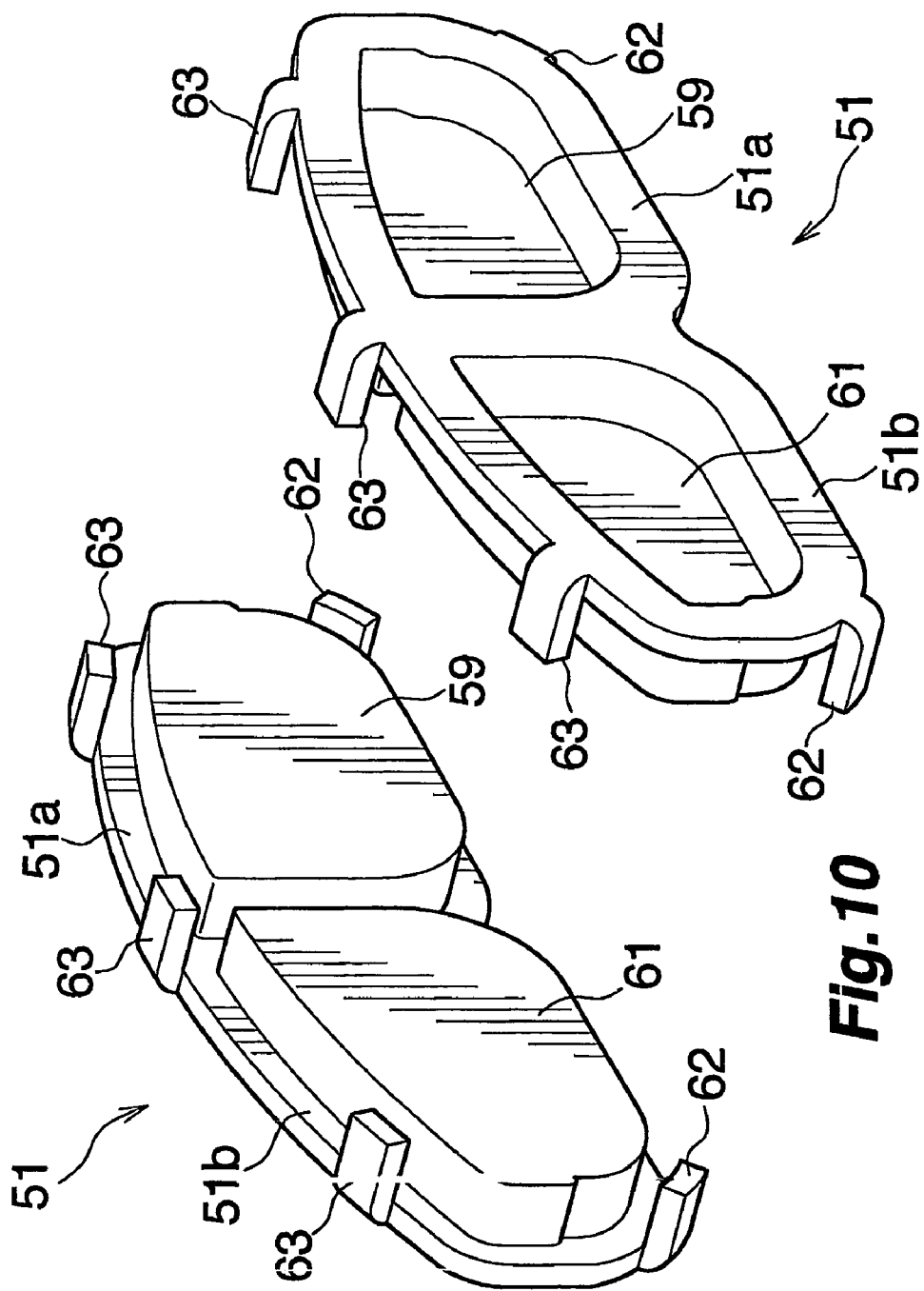
FIG. 10 is a perspective view of left and right caps of the refrigerant turn tank of the evaporator shown in FIG. 1.
Figure 11:
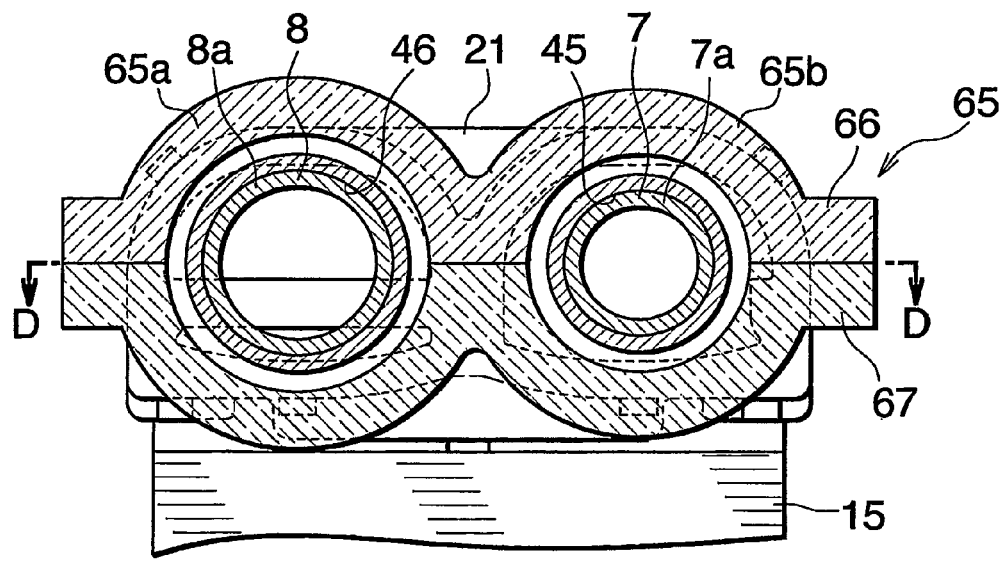
FIG. 11 is a view showing a method of brazing refrigerant inlet and outlet pipes to the pipe joint member.
Figure 12:
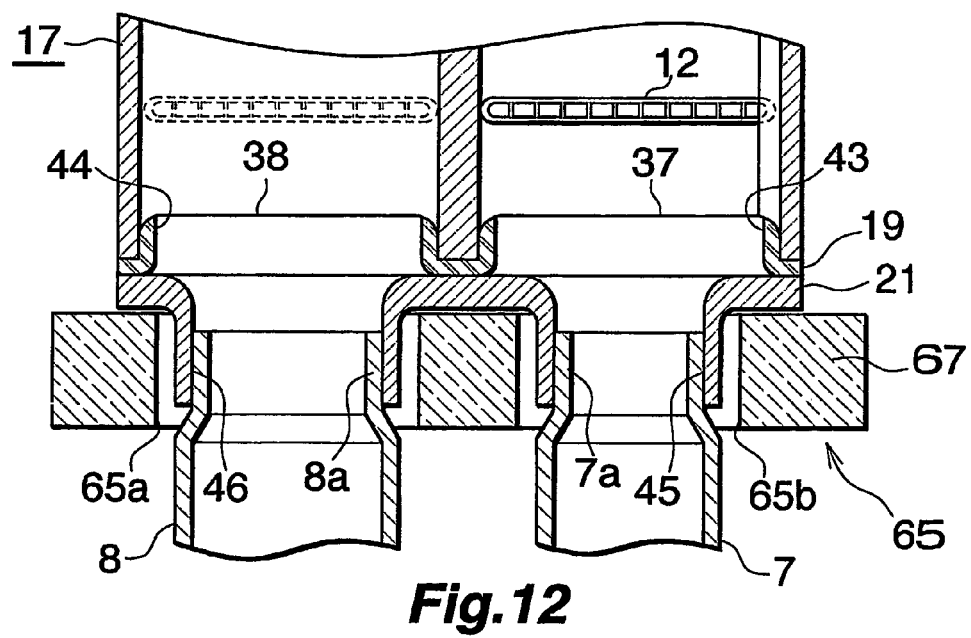
FIG. 12 is a view in section taken along the line D-D in FIG. 11.
Figure 13:
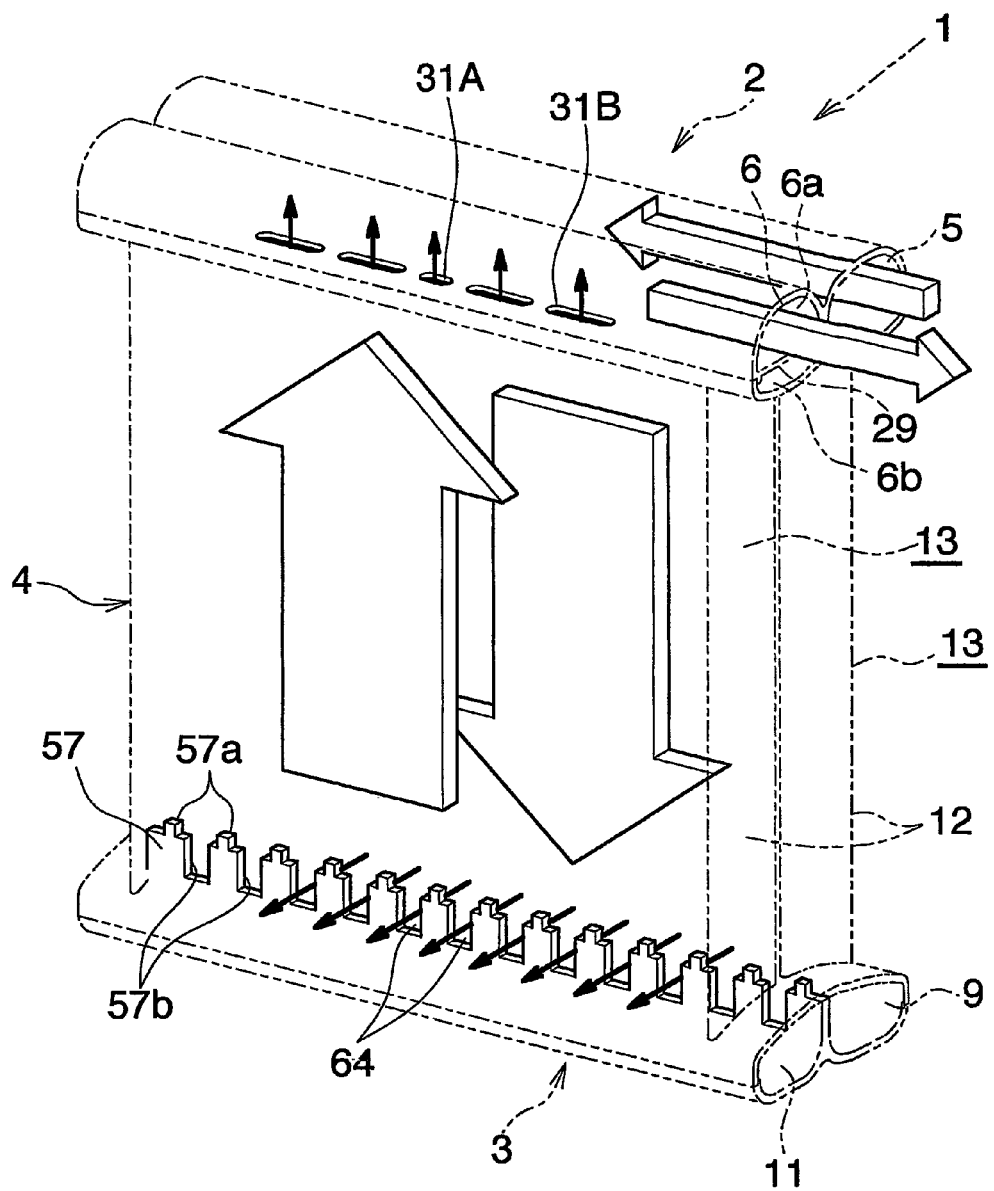
FIG. 13 is a diagram showing how a refrigerant flows through the evaporator shown in FIG. 1.

FIGS. 1 and 2 show a motor vehicle air conditioner evaporator according to the invention, FIGS. 3 to 10 show the constructions of main parts, FIGS. 11 and 12 show a method of brazing refrigerant inlet and outlet pipes to a pipe joint member, and FIG. 13 shows how a refrigerant flows through the evaporator.

FIGS. 1 and 2 show an evaporator 1 for use in air conditioners wherein a chlorofluorocarbon refrigerant is used. The evaporator 1 comprises a refrigerant inlet-outlet tank 2 of aluminum and a refrigerant turn tank 3 of aluminum which are arranged as vertically spaced apart, and a heat exchange core 4 provided between the two tanks 2, 3.

The refrigerant inlet-outlet tank 2 comprises a refrigerant inlet header 5 positioned on the front side (the downstream side with respect to the direction of flow of air through the evaporator), and a refrigerant outlet header 6 positioned on the rear side (the upstream side with respect to the flow of air). The headers 5, 6 are integral with each other and arranged in the front-rear direction, with partitioning means to be described later provided therebetween. A refrigerant inlet tube 7 of aluminum is connected to the inlet header 5 of the tank 2, and a refrigerant outlet pipe 8 of aluminum to the outlet header 6 of the tank. The refrigerant turn tank 3 comprises a refrigerant inflow header 9 positioned on the front side, and a refrigerant outflow header 10 positioned on the rear side. The headers 9, 10 are integral with each other and arranged in the front-rear direction, with partitioning means to be described later provided therebetween.

The heat exchange core 4 comprises tube groups 13 in the form of a plurality of rows, i.e., two rows in the present embodiment, as arranged in the front-rear direction, each tube group 13 comprising a plurality of heat exchange tubes 12 arranged in parallel in the left-right direction, i.e., laterally of the evaporator, at a spacing. Corrugated fins 14 are arranged respectively in air passing clearances between respective adjacent pairs of heat exchange tubes 12 of each tube group 13 and also outside the heat exchange tubes 12 at the left and right opposite ends of each tube group 13, and are each brazed to the heat exchange tube 9 adjacent thereto. An aluminum side plate 13 is disposed outside the corrugated fin 14 at each of the left and right ends and brazed to the fin 14. The heat exchange tubes 12 of the front tube group 13 have upper and lower ends joined respectively to the inlet header 5 and the inflow header 9 to provide a forward refrigerant passage portion, and the heat exchange tubes 12 of the rear tube group 13 have upper and lower ends joined respectively to the outlet header 6 and the outflow header 11 to provide a backward refrigerant passage portion.

With reference to FIGS. 3 to 6, the refrigerant inlet-outlet tank 2 comprises a platelike first member 16 made of an aluminum brazing sheet having a brazing material layer over opposite surfaces thereof and having the heat exchange tubes 12 joined thereto, a second member 17 of bare aluminum extrudate and covering the upper side of the first member 16, a right closing member 19 made of aluminum brazing sheet having a brazing material layer over opposite surfaces thereof and joined to the right ends of the two members 16, 17 for closing a right-end opening, a platelike pipe joint member 21 of aluminum brazed to the outer surface of the right closing member 19 so as to cover both the inlet header 5 and the outlet header 6 and elongated in the front-rear direction, and a left closing member 18 of aluminum joined to the left ends of the two members 16, 17 for closing the left end-opening.

The first member 16 has at each of the front and rear side portions thereof a curved portion 22 in the form of a circular arc of small curvature in cross section and bulging downward at its midportion. The curved portion 22 has a plurality of tube insertion slits 23 elongated in the front-rear direction and arranged at a spacing in the lateral direction. Each corresponding pair of slits 23 in the front and rear curved portions 22 are in the same position with respect to the lateral direction. The front edge of the front curved portion 22 and the rear edge of the rear curved portion 22 are integrally provided with respective upstanding walls 22a extending over the entire length of the member 16. The first member 16 includes between the two curved portions 22 a flat portion 24 having a plurality of through holes 25 arranged at a spacing in the lateral direction.

The second member 17 is generally m-shaped in cross section and opened downward and comprises front and rear two walls 26 extending laterally, a vertical partition wall 27 serving as the aforementioned partitioning means, provided in the midportion between the two walls 26 and extending laterally to divide the interior of the refrigerant inlet-outlet tank 2 into front and rear two spaces, and two generally circular-arc connecting walls 28 bulging upward and integrally connecting the partition wall 27 to the respective front and rear walls 26 at their upper ends. The rear wall 26 and the partition wall 27 are integrally interconnected at their lower ends by a flow dividing resistance plate 29 serving as separating means for dividing the interior of the outlet header 6 into upper and lower portions over the entire length of the member 17. The resistance plate 27 has laterally elongated refrigerant passing through holes 31A, 31B elongated laterally, formed therein at a rear portion thereof other than the left and right end portions of the plate and arranged at a spacing laterally thereof. The partition wall 27 has a lower end projecting downward beyond the lower ends of the front and rear walls 26 and is integrally provided with a plurality of projections 27a projecting downward from the lower edge of the wall 27, arranged at a spacing in the lateral direction and fitted into the through holes 25 of the first member 16. The projections 27a are formed by cutting away specified portions of the partition wall 27.

Figure 7:
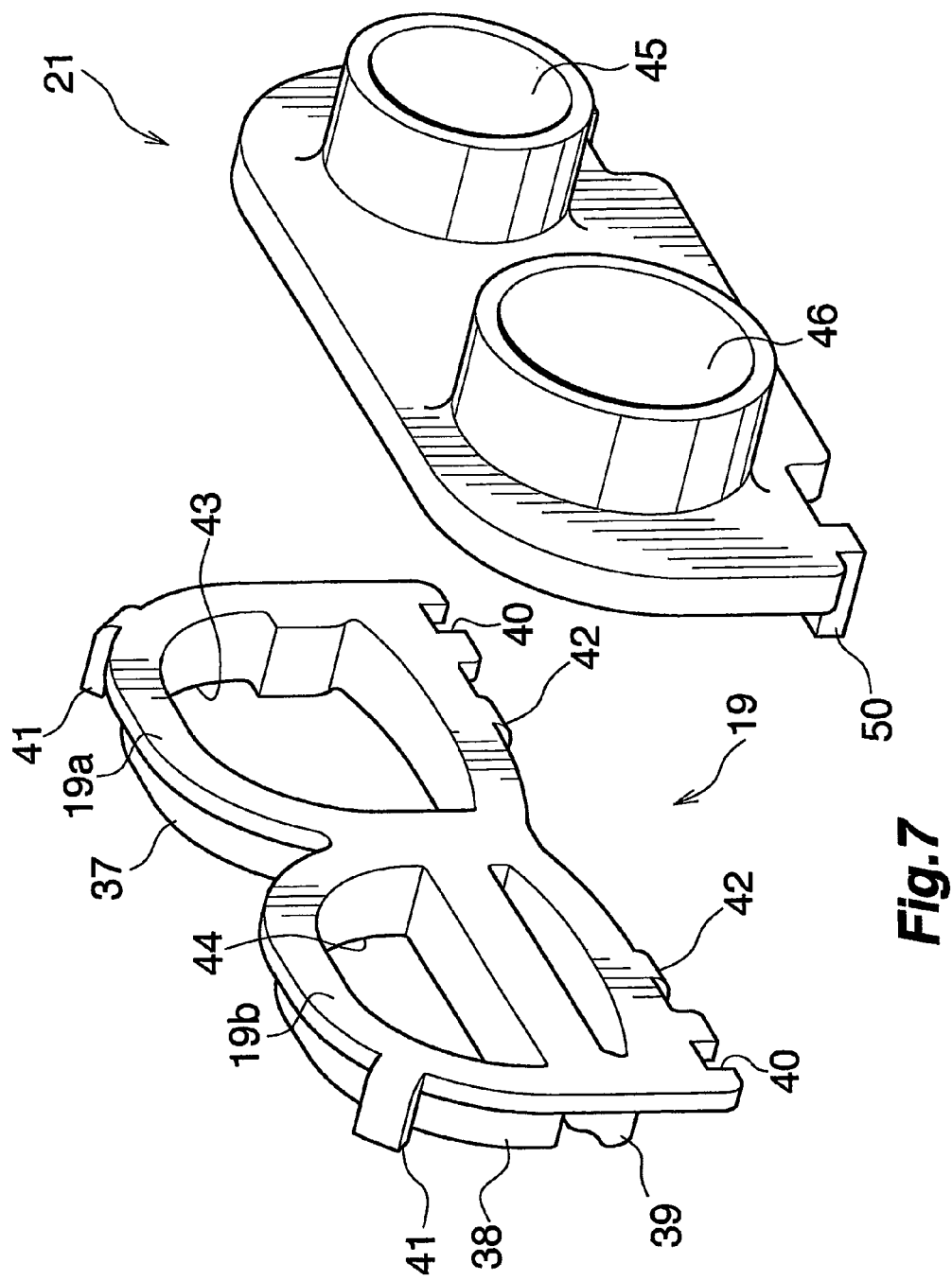
FIG. 7 is a perspective view showing a right cap and a pipe joint member of the inlet-outlet tank of the evaporator shown in FIG. 1.

With reference to FIG. 7, the right closing member 19 comprises a front cap 19a for closing the right-end opening of the inlet header 5, and a rear cap 19b for closing the right-end opening of the outlet header 6, the caps 19a, 19b being integral with each other. The front portion of the closing member 19, i.e., the front cap 19a, has a leftward protrusion 37 formed integrally therewith on its left side and to be fitted into the inlet header 5. The rear portion of the member 19, i.e., the rear cap 19b, is integrally provided, on its left side, with an upper leftward protrusion 38 to be fitted into the upper portion of the outlet header 6 above the resistance plate 29 therein and with a lower leftward protrusion 39 to be fitted into the lower portion of the header 6 under the plate 29 and positioned below and spaced apart from the protrusion 38. A refrigerant inlet 43 is formed in the bottom wall of the leftward protrusion 37 of the front portion of the right closing member 19, and a refrigerant outlet 44 is formed in the bottom wall of the upper leftward protrusion 38 of the rear portion of the closing member 19. The right closing member 19 has an engaging lug 41 projecting leftward, formed integrally therewith on a circular-arc portion between its upper edge and each of the front and rear side edges thereof and engageable with the connecting wall 28 of the second member 16. The right closing member 19 further has an engaging lug 42 projecting leftward, formed integrally therewith on each of front and rear portions of its lower edge and engageable with the curved portion 22 of the first member 16. The lower edge of the right closing member 19 is provided, at each of outer portions thereof with respect to the front-rear direction, with a positioning recess 40 for a positioning lug 50 of the pipe joint member 21 to be described below to fit in.

With reference to FIG. 7, the pipe joint member 21 has a refrigerant inlet portion 45 in the form of a short cylinder and communicating with the inlet 43 of the right closing member 19, and a refrigerant outlet portion 46 in the form of a short cylinder and communicating with the outlet 44 of the member 19. The inlet portion 45 is smaller than the outlet portion 46 in outside diameter. The pipe joint member 21 is preferably up to 50 mm in length in the front-rear direction and preferably 6 to 9 mm in the spacing S between the inlet 45 and the outlet 46. The joint member 21 has the positioning lug 50 projecting leftward, formed integrally therewith at its lower edge and engageable in the positioning recess 40 of the right closing member 19.

Figure 6:
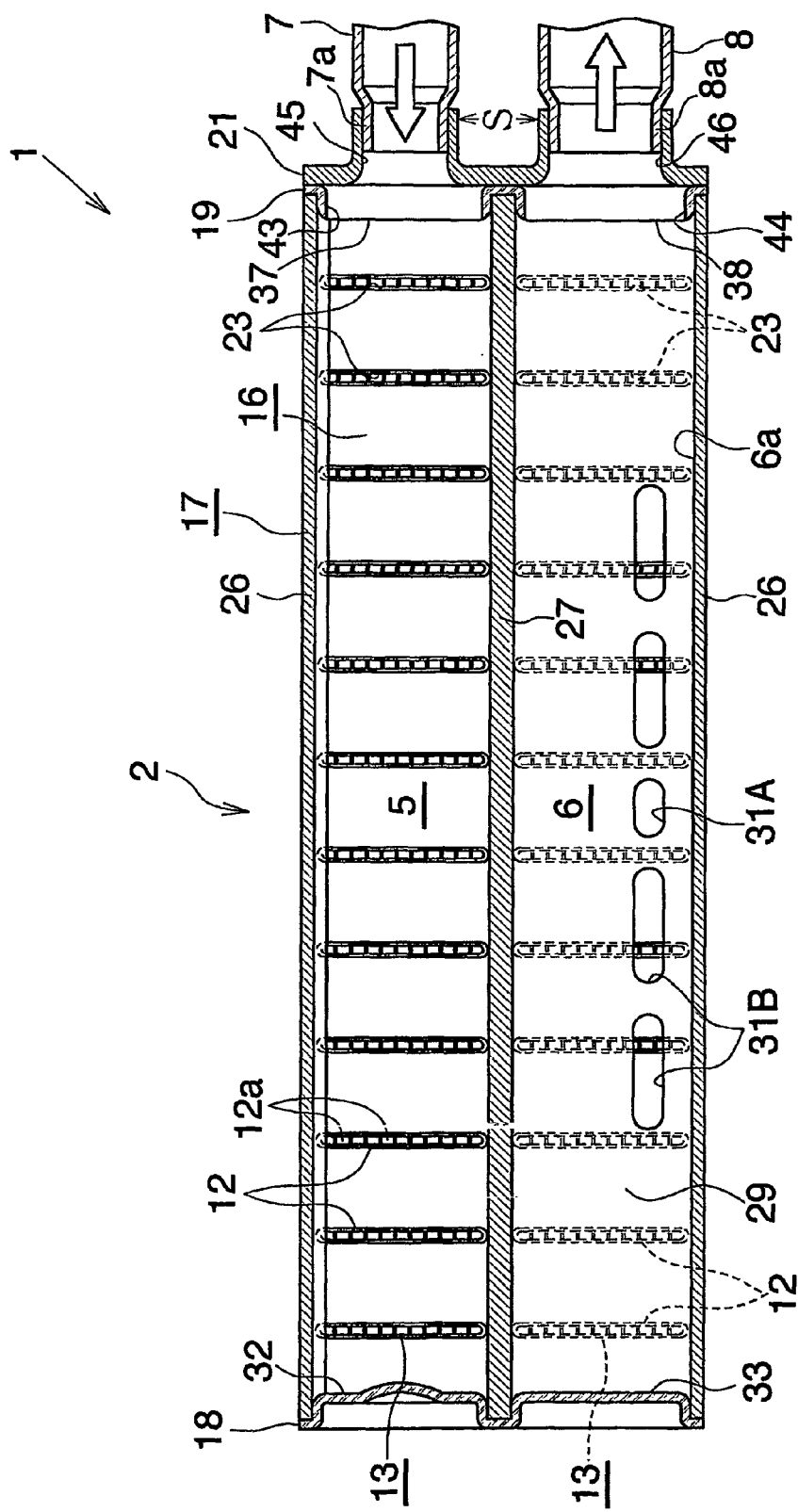
FIG. 6 is a view in section taken along the line C-C in FIG. 2.

A constricted portion 7a formed at one end of the inlet pipe 7 is inserted in and brazed to the inlet 45 of the joint member 21, and a constricted portion 8a formed at one end of the outlet pipe 8 is inserted in and brazed to the outlet 46 of the member 21 (see FIG. 6). The constricted portion 7a of the inlet pipe 7 is preferably 3 to 8.5 mm in inside diameter. Although not shown, an expansion valve mount member is provided on the other ends of the inlet pipe 7 and the outlet pipe 8 across both of these pipes.

Figure 8:
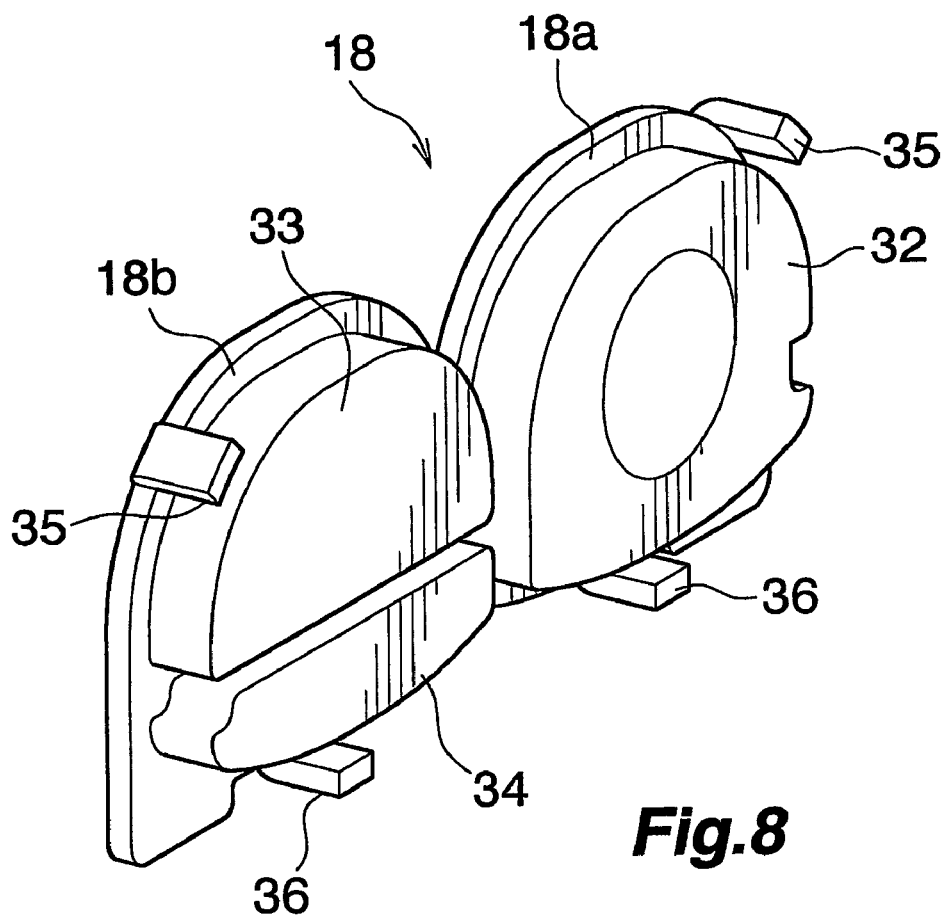
FIG. 8 is a perspective view showing a left cap of the inlet-outlet tank of the evaporator shown in FIG. 1.

With reference to FIG. 8, the left closing member 18 is symmetric to the right closing member 19. The left closing member 18 comprises a front cap 18a having no opening for closing the left-end opening of the inlet header 5, and a rear cap 18b integral with the cap 18a and having no opening for closing the left-end opening of the outlet header 6. The left closing member 18 has formed integrally therewith a rightward protrusion 32 fittable into the inlet header 5, an upper rightward protrusion 33 fittable into the upper portion of the outlet header 6 above the resistance plate 29 therein, a lower rightward protrusion 34 fittable into the lower portion of the header 6 below the resistance plate 29, engaging lugs 35 projecting rightward and engageable with the respective connecting walls 28 of the second member, and engaging lugs 36 projecting rightward and engageable with the respective curved walls 22 of the first member 16. No refrigerant inlet is formed in the front rightward protrusion 32 of the left closing member 18 and no refrigerant outlet is formed in the bottom wall of rear upper rightward protrusion 33 of the member 18. The left closing member 18 has no positioning recess in its lower edge.

The first and second members 16, 17 of the refrigerant inlet-outlet tank 2, the two closing members 18, 19 and the pipe joint member 21 are brazed together in the following manner. The first and second members 16, 17 are brazed to each other utilizing the brazing material layer of the first member 16, with the projections 27*a* of the second member 17 inserted through the respective through holes 25 of the first member 16 in crimping engagement therewith and with the upper ends of the front and rear upstanding walls 22*a* of the first member 16 thereby engaged with the lower ends of the front and rear walls 26 of the second member 17. The two closing members 18, 19 are brazed to the first and second members 16, 17 utilizing the brazing material layers of the closing members 18, 19, with the protrusions 32, 37 of the front caps 18*a*, 19*a* fitting in the front space inside the two members 16, 17 forwardly of the partition wall 27, with the upper protrusions 33, 38 of the rear caps 18*b*, 19*b* fitting in the upper space inside the two members 16, 17 rearwardly of the partition wall 27 and above the resistance plate 29, with the lower protrusions 34, 39 of the rear caps 18*b*, 19*b* fitting in the lower space rearwardly of the partition wall 27 and below the resistance plate 29, with the upper engaging lugs 35, 41 engaged with the connecting walls 28 of the second member 17, and with the lower engaging lugs 36, 42 engaged with the curved portions 22 of the first member 16. The pipe joint plate 21 is brazed to the right closing member 19 utilizing the brazing material layer of the member 19, with the positioning lugs 50 engaged in the positioning recesses 40 of the member 19. In this way, the refrigerant inlet-outlet tank 2 is made. The portion of the second member 17 forwardly of the partition wall 27 serves as the inlet header 2, and the portion of the member 17 rearward of the partition wall 27 as the outlet header 6. The outlet header 6 is divided by the flow dividing resistance plate 29 into upper and lower spaces 6*a*, 6*b*, which are held in communication by the refrigerant passing holes 31A, 31B. The refrigerant outlet 44 of the right closing member 19 is in communication with the upper space 6*a* of the outlet header 6. The refrigerant inlet portion 45 of the pipe joint member 21 communicates with the refrigerant inlet 43, and the refrigerant outlet portion 46 communicates with the outlet 44.

Figure 4:
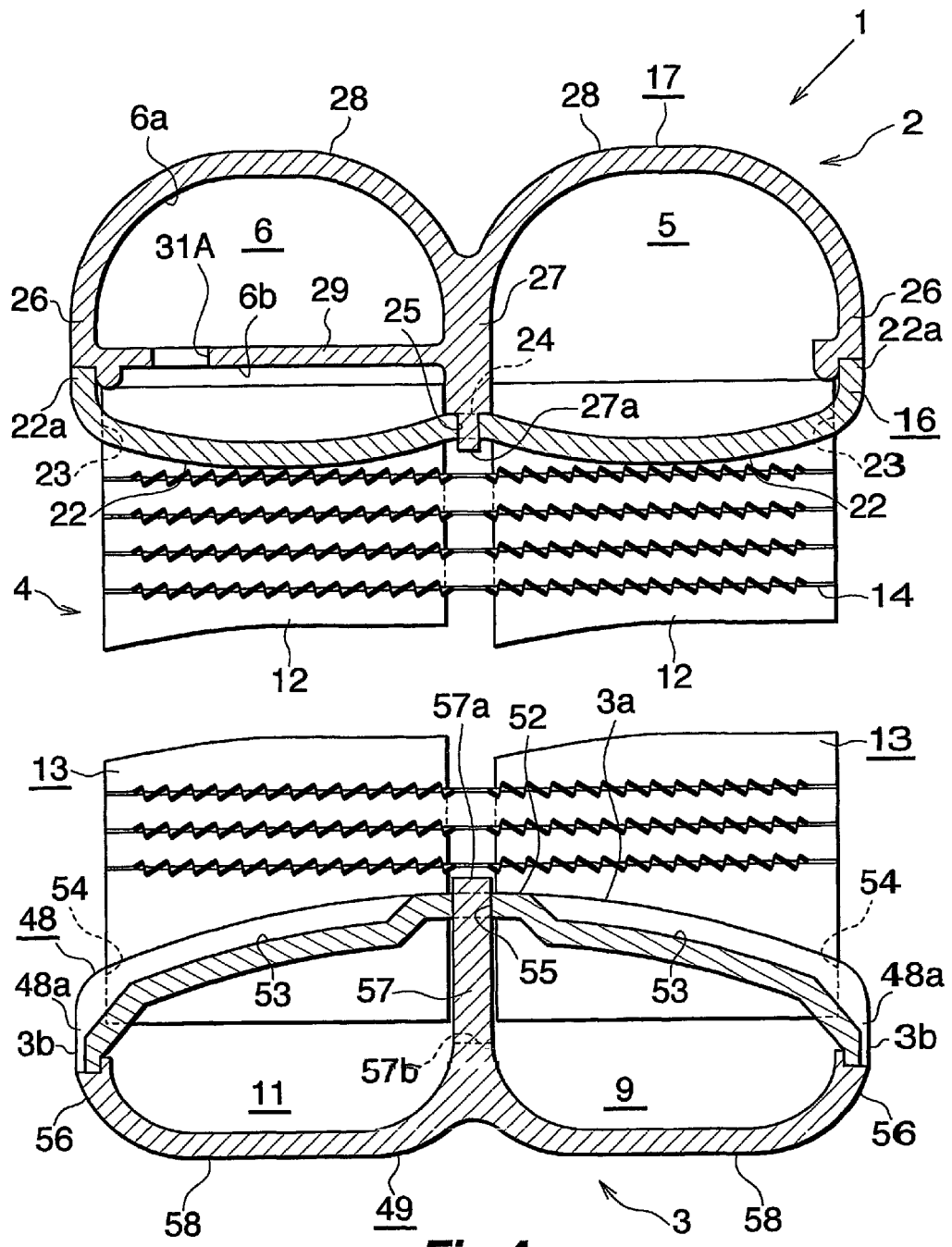
FIG. 4 is an enlarged fragmentary view in section taken along the line A-A in FIG. 2.
Figure 5:
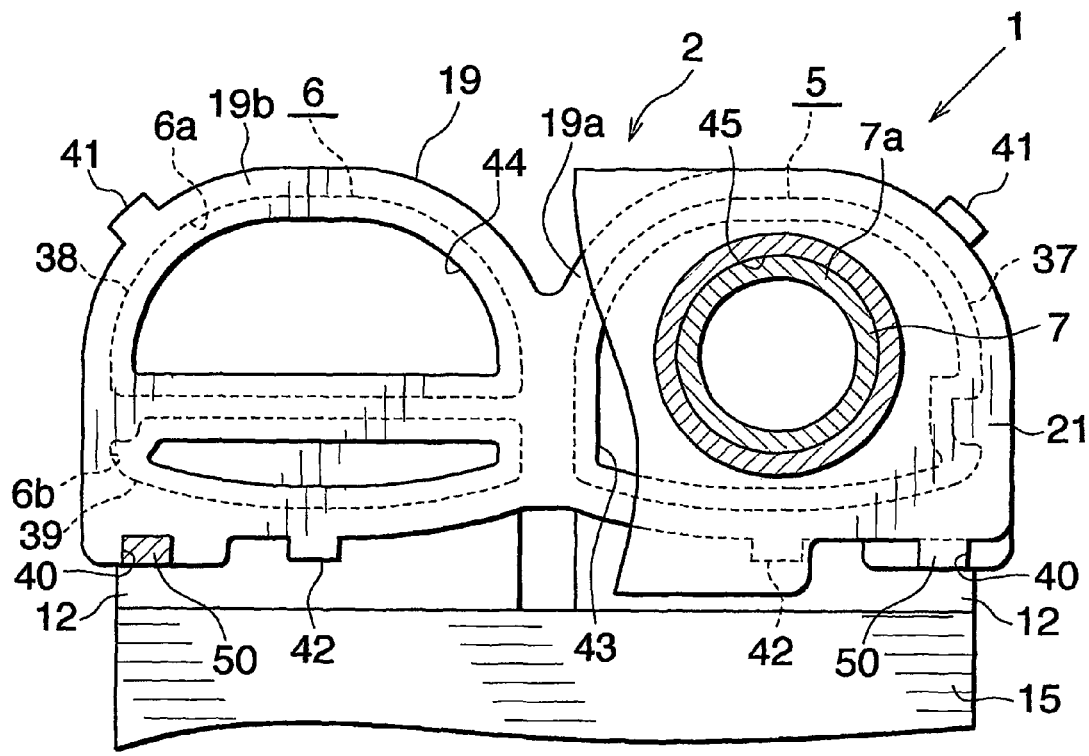
FIG. 5 is an enlarged fragmentary view in section taken along the line B-B in FIG. 2.
Figure 5:
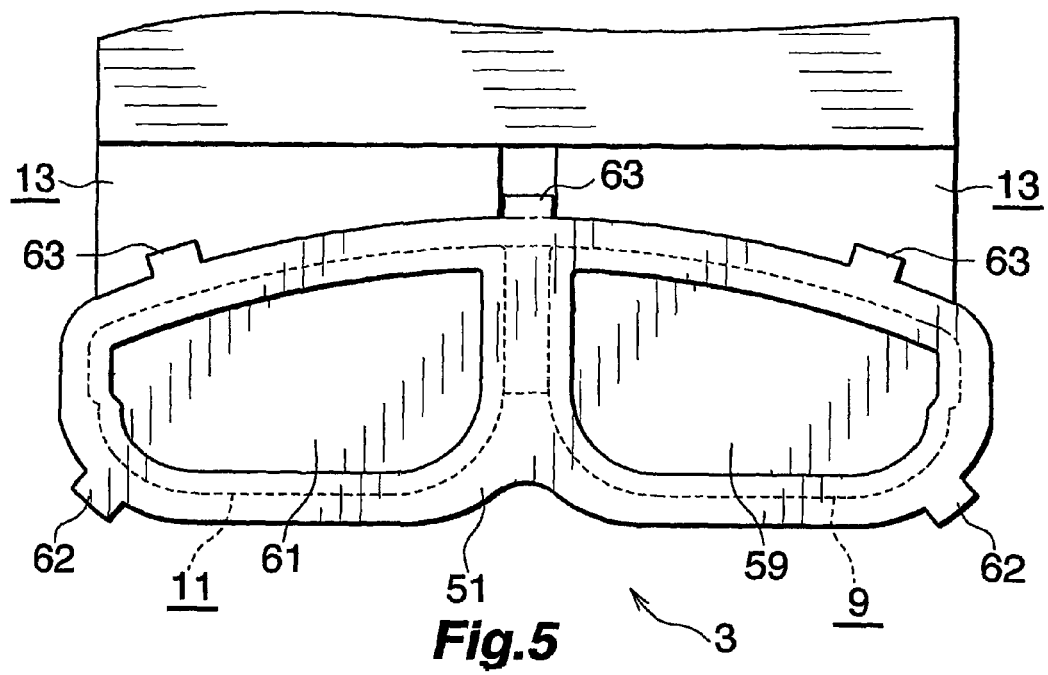

With reference to FIGS. 4 and 9, the refrigerant turn tank 3 comprises a platelike first member 48 made of aluminum brazing sheet having a brazing material layer over opposite surfaces thereof and having the heat exchange tubes 9 joined thereto, a second member 49 made of bare aluminum extrudate and covering the lower side of the first member 48, and aluminum closing members 51 made of aluminum brazing sheet having a brazing material layer over opposite surfaces thereof for closing left and right opposite end openings.

The refrigerant turn tank 3 has a top surface 3*a* which is in the form of a circular-arc in cross section in its entirety such that the midportion thereof with respect to the front-rear direction is the highest portion 52 which is gradually lowered toward the front and rear sides. The tank 3 is provided in its front and rear opposite side portions with grooves 53 extending from the front and rear opposite sides of the highest portion 52 of the top surface 3*a* to front and rear opposite side surfaces 3*b*, respectively, and arranged laterally at a spacing.

The first member 48 has a circular-arc cross section bulging upward at its midportion with respect to the front-rear direction and is provided with a depending wall 48*a* formed at each of the front and rear side edges thereof integrally therewith and extending over the entire length of the member 48. The upper surface of the first member 48 serves as the top surface 3*a* of the refrigerant turn tank 3, and the outer surface of the depending wall 48*a* as the front or rear side surface 3*b* of the tank 3. The grooves 53 are formed in each of the front and rear side portions of the first member 48 and extend from the highest portion 52 in the midportion of the member 48 with respect to the front-rear direction to the lower end of the depending wall 48*a*. In each of the front and rear side portions of the first member 48 other than the highest portion 52 in the midportion thereof, tube insertion slits 54 elongated in the front-rear direction are formed between respective adjacent pairs of grooves 53. Each corresponding pair of front and rear tube insertion slits 54 are in the same position with respect to the lateral direction. The first member 48 has a plurality of through holes 55 formed in the highest portion 52 in the midportion thereof and arranged laterally at a spacing. The depending walls 48*a*, grooves 53, tube insertions slits 54 and through holes 55 of the first member 48 are formed at the same time by making the member 48 from an aluminum brazing sheet by press work.

The second member 49 is generally w-shaped in cross section and opened upward, and comprises front and rear two walls 56 curved upwardly outwardly forward and rearward, respectively, and extending laterally, a vertical partition wall 57 serving as the aforementioned partitioning means, provided at the midportion between the two walls 56, extending laterally and dividing the interior of the refrigerant turn tank 3 into front and rear two spaces, and two connecting walls 58 integrally connecting the partition wall 57 to the respective front and rear walls 56 at their lower ends. The partition wall 57 has an upper end projecting upward beyond the upper ends of the front and rear walls 56 and is provided with a plurality of projections 57*a* projecting upward from the upper edge thereof integrally therewith, arranged laterally at a spacing and fitted into the respective through holes 55 in the first member 48. The partition wall 57 is provided with refrigerant passing cutouts 57*b* formed in its upper edge between respective adjacent pairs of projections 57*a*. The projections 57*a* and the cutouts 57*b* are formed by cutting away specified portions of the partition wall 57.

The second member 49 is produced by extruding the front and rear walls 56, partition wall 57 and connecting walls 58 integrally, and cutting the partition wall 57 to form the projections 57*a* and cutouts 57*b*.

With reference to FIG. 10 each of the closing members 51 comprises a front cap 51*a* for closing the corresponding end of the inflow header 5 and a rear cap 51*b* integral with the cap 51*a* for closing the corresponding end of the outlow header 11. The front portion of the closing member 51, i.e., the front cap 51*a*, has a laterally inward protrusion 59 formed on the laterally inner side thereof integrally therewith and fittable into the inflow header 9. The rear portion of the member 51, i.e., the rear cap 51*b*, has a laterally inward Protrusion 61 formed on the laterally inner side thereof integrally therewith and fittable into the outflow header 11. The closing member 51 is integrally provided at a circular-arc portion between the lower edge thereof and each of the front and rear side edges thereof with an engaging lug 62 projecting laterally inward and engageable with the front or rear wall 56 of the second member 49, and further has a plurality of engaging lugs 63 arranged at a spacing in the front-rear direction, formed on its upper edge integrally therewith, projecting laterally inward and engageable with the first member 48.

The first and second members 48, 49 of the turn tank 3 and the two closing members 51 thereof are brazed together in the following manner. The first and second members 48, 49 are brazed to each other utilizing the brazing material layer of the first member 48, with the projections 57*a* of the second member 49 inserted through the respective holes 55 in crimping engagement and with the lower ends of front and rear depending walls 48*a* of the first member 48 in engagement with the upper ends of front and rear walls 56 of the second member 49. The two closing members 51 are brazed to the first and second members 48, 49 using the brazing material layers of the closing members 51, with the front protrusions 59 fitted in the space defined by the two members 48, 49 and positioned forwardly of the partition wall 57, with the rear protrusions 61 fitted in the space defined by the two members 48, 49 and positioned rearwardly of the partition wall 57, with the upper engaging lugs 63 engaged with the first member 48 and with the lower lugs 62 engaged with the front and rear walls 56 of the second member 49. In this way, the refrigerant turn tank 3 is formed. The portion of the second member 49 forwardly of the partition wall 57 serves as the inflow header 9, and the portion thereof rearwardly of the partition wall 57 as the outflow header 11. The upper-end openings of the cutouts 57b in the partition wall 57 of the second member 49 are closed with the first member 48, whereby refrigerant passing holes 64 are formed.

The heat exchange tubes 12 providing the front and rear tube groups 13 are each made of aluminum extrudate. Each tube 12 is flat, has a large width in the front-rear direction and is provided in its interior with a plurality of refrigerant channels 12a extending longitudinally of the tube and arranged in parallel. The tubes 12 have upper end portions inserted through the slits 23 in the first member 16 of the refrigerant inlet-outlet tank 2 and are brazed to the first member 16 utilizing the brazing material layer of the member 16. The tubes 12 have lower end portions inserted through the slits 54 in the first member 48 of the refrigerant turn tank 3 and are brazed to the first member 48 utilizing the brazing material layer of the member 48.

Preferably, the heat exchange tube 12 is 0.75 to 1.5 mm in height, i.e., in thickness in the lateral direction, 12 to 18 mm in width in the front-rear direction, 0.175 to 0.275 mm in the wall thickness of the peripheral wall thereof, 0.175 to 0.275 mm in the thickness of partition walls separating refrigerant channels from one another, 0.5 to 3.0 mm in the pitch of partition walls, and 0.35 to 0.75 mm in the radius of curvature of the outer surfaces of the front and rear opposite end walls.

In place of the heat exchange tube 12 of aluminum extrudate, an electric resistance welded tube of aluminum may be used which has a plurality of refrigerant channels formed therein by inserting inner fins into the tube. Also usable is a tube which is made from a plate prepared from an aluminum brazing sheet having an aluminum brazing material layer one surface thereof by rolling work and which comprises two flat wall forming portions joined by a connecting portion, a side wall forming portion formed on each flat wall forming portion integrally therewith and projecting from one side edge thereof opposite to the connecting portion, and a plurality of partition forming portions projecting from each flat wall forming portion integrally therewith and arranged at a spacing widthwise thereof, by bending the plate into the shape of a hairpin at the connecting portion and brazing the side wall forming portions to each other in butting relation to form partition walls by the partition forming portions.

The corrugated fin 14 is made from an aluminum brazing sheet having a brazing material layer on opposite sides thereof by shaping the sheet into a wavy form. Louvers are formed as arranged in parallel in the front-rear direction in the portions of the wavy sheet which connect crest portions thereof to furrow portions thereof. The corrugated fins 14 are used in common for the front and rear tube groups 13. The width of the fin 14 in the front-rear direction is approximately equal to the distance from the front edge of the heat exchange tube 12 in the front tube grout 13 to the rear edge of the corresponding heat exchange tube 12 in the rear tube group 13. It is desired that the corrugated fin 14 be 7.0 mm to 10.0 mm in fin height, i.e., the straight distance from the crest portion to the furrow portion, and 1.3 to 1.8 mm in fin pitch, i.e., the pitch of connecting portions. Instead of one corrugated fin serving for both the front and rear tube groups 13 in common, a corrugated fin may be provided between each adjacent pair of heat exchange tubes 12 of each tube group 13.

The evaporator 1 is fabricated by tacking the components in combination and brazing the tacked assembly collectively.

The refrigerant inlet pipe 7 and the refrigerant outlet pipe 8 are brazed to the pipe joint member 21 in the following manner. First, the constricted portion 7a of the inlet pipe 7 and the constricted portion 8a of the outlet pipe 8 are fitted respectively into the refrigerant inlet portion 45 and the refrigerant outlet portion 46 of the pipe joint member 21. A high-frequency heating coil 65 is then provided around the inlet portion 45 and the outlet portion 46 as shown in FIGS. 11 and 12. The heating coil 65 is a spectacle-shaped assembly of two annular portions 65a, 65b, and comprises an upper half segment 66 including two semicircular portions in the form of an integral piece and opened downward for providing an upper half assembly of the two annular portions 65a, 65b, and a lower half segment 67 including two semicircular portions in the form of an integral piece and opened upward for providing a lower half assembly of the two annular portions 65a, 65b. One of the upper half segment 66 and the lower half segment 67, for example, the lower half segment 67, is placed around the joint member 21 with the inlet portion 45 and the outlet portion 46 positioned in the two semicircular portions, and the upper half segment 66 is thereafter fitted to the lower segment 67. Subsequently, the inlet portion 45 and the outlet portion 46 of the joint member 21 are brazed to the inlet pipe 7 and the outlet pipe 8, respectively, at the same time using the heating coil 65. The brazing operation may be conducted by applying a brazing material to the required portions, or by making the pipe joint member 21 from an aluminum brazing sheet having a brazing material layer over one surface thereof and using the brazing material layer as formed on the inner peripheral surfaces of the inlet and outlet portions 45, 46. When the pipe joint member 21 is 6 to 9 mm in the spacing between the inlet portion 45 and the outlet portion 46, the high-frequency heating coil 65 can be fitted around these portions 45, 46 automatically for brazing.

Along with a compressor and a condenser, the evaporator 1 constitutes a refrigeration cycle, which is installed in vehicles, for example, in motor vehicles for use as an air conditioner.

With reference to FIG. 13 showing the evaporator 1 described, a two-layer refrigerant of vapor-liquid mixture phase flowing through a compressor, condenser and expansion valve enters the refrigerant inlet header 5 via the refrigerant inlet pipe 7, the refrigerant inlet portion 45 of the pipe joint member 21 and the refrigerant inlet 43 of the right closing 19 and dividedly flows into the refrigerant channels 12a of all the heat exchange tubes 12 of the front tube group 13. When the constricted portion 7a of the inlet pipe 7 has an inside diameter of 3 to 8.5 mm, the refrigerant reaches the left end of the inlet header 5 and uniformly flows into all the heat exchange tubes 12 of the front tube group 13 at this time.

The refrigerant flowing into the channels 12a of all the heat exchange tubes 12 flows down the channels 12a, ingresses into the refrigerant inflow header 9 of the refrigerant turn tank 3. The refrigerant in the header 9 flows through the refrigerant passing holes 64 of the partition wall 57 into the refrigerant outflow header 11.

The refrigerant flowing into the outflow header 11 dividedly flows into the refrigerant channels 12a of all the heat exchange tubes 12 of the rear tube group 13, changes its course and passes upward through the channels 12a into the lower space 6b of the outlet header 6. The resistance given by the flow dividing resistance plate 29 in this header to the flow of refrigerant enables the refrigerant to uniformly flow from the outflow header 8 into all heat exchange tubes 12 of the rear tube group 13 and also to flow from inlet header 5 into all the tubes 12 of the front tube group 13 more uniformly. As a result, the refrigerant flows through all the heat exchange tubes 12 of the two tube groups 13 in uniform quantities.

Subsequently, the refrigerant flows through the refrigerant passing holes 31A, 31B of the resistance plate 29 into the upper space 6a of the outlet header 6 and flows out of the evaporator via the refrigerant outlet 44 of the right closing member 19, the outlet portion 46 of the pipe joint member 21 and the outlet pipe 8. While flowing through the refrigerant channels 12a of the heat exchange tubes 12 of the front tube group 13 and the refrigerant channels 12a of the heat exchange tubes 12 of the rear tube group 13, the refrigerant is subjected to heat exchange with the air flowing through the air passing clearances in the direction of arrow X shown in FIG. 1 and flows out of the evaporator in a vapor phase.

At this time, water condensate is produced on the surfaces of the corrugated fins 14, and the condensate flows down the top surface 3a of the turn tank 3. The condensate flowing down the tank top surface 3a enters the grooves 53 by virtue of a capillary effect, flows through the grooves 53 and falls off the forwardly or rearwardly outer ends of the grooves 53 to below the turn tank 3. This prevents a large quantity of condensate from collecting between the top surface 3a of the turn tank 3 and the lower ends of the corrugated fins 14, consequently preventing the condensate from freezing due to the collection of large quantity of the condensate, whereby inefficient performance of the evaporator 1 is precluded.

One group 13 of heat exchange tubes is provided between the inlet header 5 and the inflow header 9 of the two tanks 2, 3, as well as between the outlet header 6 and the outflow header 11 thereof according to the foregoing embodiment, whereas this arrangement is not limitative; one or at least two groups 13 of heat exchange tubes may be provided between the inlet header 5 and the inflow header 9 of the two tanks 2, 3, as well as between the outlet header 6 and the outflow header 11 thereof. The evaporator may be used with the turn tank 3 positioned above the inlet-outlet tank 2.

Figure 14:
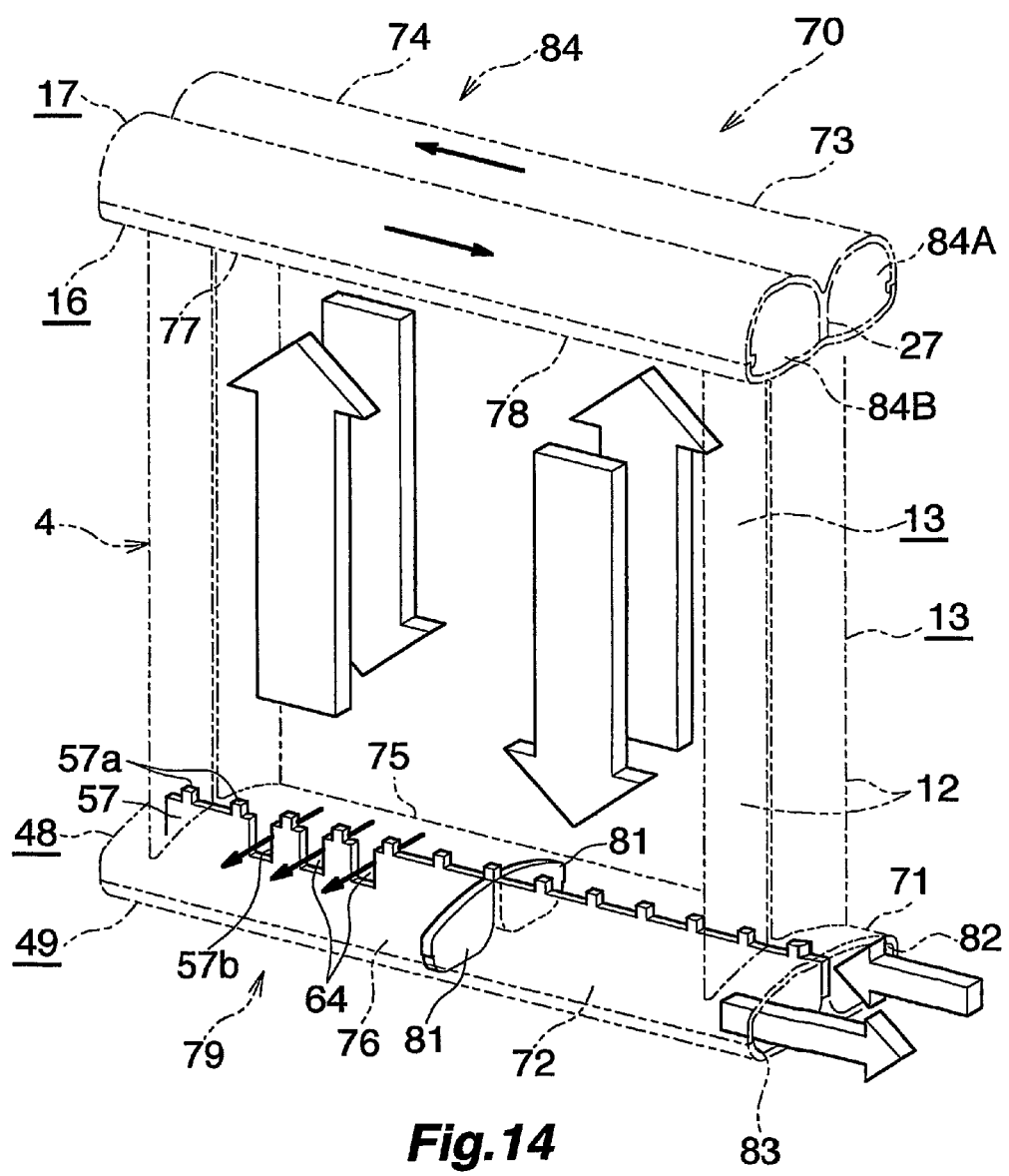
FIG. 14 is a view corresponding to FIG. 13 and showing a second embodiment of evaporator.

FIG. 14 shows a second embodiment of the invention. Throughout FIGS. 1 to 14, like parts are designated by like reference numerals.

FIG. 14 shows an evaporator 70 which comprises a refrigerant inlet header 71 and a refrigerant outlet header 72 which are arranged side by side from the front rearward, a first intermediate header 73 provided above the inlet header 71 and spaced apart therefrom, a second intermediate header 74 provided on the left side of the first intermediate header 73, a third intermediate header 75 disposed below and spaced apart from the second intermediate header 74 and positioned on the left side of the inlet header 71, a fourth intermediate header 74 provided alongside the third intermediate header 75 on the rear side thereof and positioned on the left side of the outlet header 72, a fifth intermediate header 77 provided above and spaced apart from the fourth intermediate header 76 and disposed alongside the second intermediate header 74 on the rear side thereof, and a sixth intermediate header 78 disposed above and spaced part from the outlet header 72 and positioned on the right side of the fifth intermediate header 77.

The inlet header 71, outlet header 72, third intermediate header 75 and fourth intermediate header 76 are formed by separating one tank 79 into four portions arranged from the front rearward and from the left to the right. The tank 79 is similar to the refrigerant turn tank 3 of the first embodiment and comprises a first member 48 and a second member 49.

The tank 79 differs from turn tank 3 with respect to the following. The tank 79 is divided into a front and a rear space by a partition wall 57 inside the tank, and each of these spaces is divided into a left and a right portion by an aluminum partition plate 81 disposed at the midportion with respect to the left-right direction, whereby four headers 71, 72, 75, 76 are provided. The portion of the partition wall 57 on the right side of the partitions plate 81 has no cutouts 57b, and the inlet header 71 is held out of communication with the outlet header 72. A closing member 51 for the right-end openings has a refrigerant inlet 82 formed in the bottom wall of a front protrusion 59, and a refrigerant outlet 83 formed in a rear protrusion 61. Although not shown, brazed to the outer surface of the right closing member 51 is a pipe joint member 21 having a refrigerant inlet portion 45 communicating with the inlet 82 and a refrigerant outlet portion 46 communicating with the outlet 83.

The first intermediate header 73, the second intermediate header 74, the fifth intermediate header 77 and the sixth intermediate header 78 are formed by separating one tank 84 into front and rear two divisions 84A, 84B. The right portion of the front division 84A provides the first intermediate header 73, and the left portion thereof provides the second intermediate header 74. The right portion of the rear division 84B provides the sixth intermediate header 78, and the left portion thereof provides the fifth intermediate header 77. The tank 84 is similar to the inlet-outlet tank 2 of the first embodiment in construction and comprises a first member 16 and a second member 17. The tank 84 differs from the inlet-outlet tank 2 with respect to the following. The tank 84 has no flow dividing resistance plate 29. A closing member 19 for closing the right-end openings has neither of the inlet 43 and the outlet 44. The closing member 19 has no pipe joint member 21 brazed thereto.

A heat exchange core 4 is provided between the assembly of the inlet header 71, outlet header 72, third intermediate header 75 and fourth intermediate header 76 and the assembly of the first intermediate header 73, second intermediate header 74, fifth intermediate header 77 and sixth intermediate header 78. Heat exchange tubes 12 of a front tube group 13 have their lower end portions joined to the inlet header 71 and the third intermediate header 75 and have their upper end portions joined to the first intermediate header 73 and the second intermediate header 74. Further heat exchange tube 12 of a rear tube group 13 have their lower end portions joined to the outlet header 72 and the fourth intermediate header 76 and have their upper end portions joined to the sixth intermediate header 78 and the fifth intermediate header 77.

With reference to FIG. 14 showing the evaporator 70 described, a two-layer refrigerant of vapor-liquid mixture phase flowing through a compressor, condenser and expansion valve enters the refrigerant inlet header 71 via the inlet pipe 7, the refrigerant inlet portion 45 of the pipe joint member 21 and the refrigerant inlet 82 of the right closing member 51 and dividedly flows into the refrigerant channels 12a of all the heat exchange tubes 12 joined to the inlet header 71 and included in the front tube group 13. The refrigerant flows up the channels 12a, enters the first intermediate header 73, and flows leftward into the second intermediate header 74. The refrigerant in this header 74 dividedly flows into the refrigerant channels 12a of all the heat exchange tubes 12 joined to the second intermediate header 74 and included in the front tube group 13, flows down the channels 12a, enters the third intermediate header 75 and flows into the fourth intermediate header 76 through the refrigerant passing holes 64 in the partition wall 57. The refrigerant in the header 76 then dividedly flows into the refrigerant channels 12a of all the heat exchange tube 12 joined to the fourth intermediate header 76 and included in the rear tube group 13, flows up the channels 12a, enters the fifth intermediate header 77 and flows rightward into the sixth intermediate header 78. The refrigerant in the header 78 then dividedly flows into the channels 12a of all the heat exchange tubes 12 joined to the header 78 and included in the rear tube group 13, flows down the channels 12a and enters the outlet header 72. The refrigerant then flows through the refrigerant outlet 83 of the right closing member 51 and the outlet portion 46 of the joint member 21 and flows out through the outlet pipe 8.

One group 13 of heat exchange tubes is provided between the inlet header 71 and the third intermediate header 75, and the first and second intermediate headers 73, 74 of the two tanks 79, 84, and also between the outlet header 72 and the fourth intermediate header 76, and the sixth and fifth intermediate headers 78, 77, according to the foregoing second embodiment, whereas this arrangement is not limitative; one or at least two groups 13 of heat exchange tubes may be provided between the headers 71, 75 and the headers 73, 74 and between the headers 72, 76 and the headers 78, 77. The evaporator may be used with the tank 79 positioned above the tank 84.

The evaporator of the invention can be embodied as an evaporator which comprises a refrigerant inlet header and a refrigerant outlet header which are arranged in the front-rear direction, and a refrigerant circulating passage for holding the two headers in communication with each other, the circulating passage comprising two intermediate headers and a plurality of heat exchange tubes, the inlet header being opposed to one of the intermediate headers, the outlet header being opposed to the other intermediate header, a group of heat exchange tubes arranged at a spacing and in the form of at least one row disposed between each opposed pair of headers, the heat exchange tubes in the group having opposite ends joined to the opposed pair of headers respectively, the inlet header having a refrigerant inlet at one end thereof, the outlet header having a refrigerant outlet at one end thereof alongside the inlet end, a refrigerant being permitted to flow from the inlet into the inlet header and to return to the outlet header through the circulating passage so as to be sent out of the outlet.

The evaporator of the invention can be embodied also as an evaporator of the so-called stacked plate type which comprises a plurality of flat hollow bodies arranged in parallel and each composed of a pair of dishlike plates facing toward each other and brazed to each other along peripheral edges thereof, a refrigerant inlet header and a refrigerant outlet header which are arranged in the front-rear direction, a refrigerant turn portion disposed as spaced from the two headers, a plurality of forward refrigerant passage portions for holding the inlet header in communication with the turn portion therethrough, and a plurality of backward refrigerant passage portions for holding the outlet header in communication with the turn portion, the inlet header having a refrigerant inlet at one end thereof, the outlet header having a refrigerant outlet at one end thereof alongside the inlet end, a refrigerant being permitted to flow from the inlet into the inlet header, then to flow through the forward passage portions into the turn portion where the refrigerant changes its course, thereafter to flow through the backward passage portions into the outlet header so as to be sent out from the outlet.

INDUSTRIAL APPLICABILITY

The present invention provides an evaporator suitable for use in motor vehicle air conditioners which are refrigeration cycles to be installed in motor vehicles. The evaporator of the invention is relatively easy to fabricate, and short-circuiting between the refrigerant inlet header and the refrigerant outlet header can be prevented.

The invention claimed is:

1. An evaporator comprising:
   a refrigerant inlet header;
   a refrigerant outlet header arranged side by side with respect to the refrigerant inlet header in a front-rear directionll and a refrigerant circulating passage holding the refrigerant inlet and refrigerant outlet headers in communication with each other therethrough,
   wherein the refrigerant inlet header has a refrigerant inlet at one end thereof, the refrigerant outlet header has a refrigerant outlet at one end thereof alongside the refrigerant inlet, the refrigerant inlet permits a refrigerant to flow into the inlet header and to the outlet header through the refrigerant circulating passage so as to be sent out from the refrigerant outlet, the refrigerant inlet header is provided with a cap closing the one end of the refrigerant inlet header and forming the refrigerant inlet, the refrigerant outlet header is provided with a cap closing the one end of the refrigerant outlet header and forming the refrigerant outlet, the caps of the inlet header and the outlet header are joined to a pipe joint member having a refrigerant inlet portion in communication with the refrigerant inlet and a refrigerant outlet portion in communication with the refrigerant outlet, one of the caps and the pipe joint member is provided with a positioning lug which is projecting from a side edge of the one of the caps and the pipe joint member toward other one of the caps and the pipe joint member and which is configured to be fitted with a positioning recess formed in the other one of the caps and the pipe joint member, and the caps and the pipe joint member have flat surfaces to be contact with each other and are brazed such that the positioning lug is engaged with the positioning recess and that the flat surfaces of the caps and the pipe joint member are in contact with each other.

2. The evaporator according to claim 1, wherein the refrigerant inlet portion and the refrigerant outlet portion of the pipe joint member are each in the form of a tube, a refrigerant inlet pipe having a constricted end portion inserted in and joined to the refrigerant inlet portion, a refrigerant outlet pipe having an end portion inserted in and joined to the refrigerant outlet portion.

3. The evaporator according to claim 2, wherein the refrigerant inlet portion is smaller than the refrigerant outlet portion in outside diameter.

4. The evaporator according to claim 2, wherein the refrigerant outlet pipe is provided at said end portion with a constricted portion inserted in and joined to the refrigerant outlet portion.

5. The evaporator according to claim 1, wherein the caps are in the form of an integral piece.

6. The evaporator according to claim 1, wherein the inlet header and the outlet header comprise a first member forming portions of the refrigerant inlet and outlet headers adjacent to the circulating passage and a second member forming the remaining portions of the refrigerant inlet and outlet headers and brazed to the first member, whereby the refrigerant inlet and outlet headers are made integral with each other, each of the caps having engaging lugs engageable with the first member and the second member respectively.

7. A process for fabricating an evaporator, comprising:
   forming a refrigerant inlet header, a refrigerant outlet header arranged side by side with respect to the refrigerant inlet header in a front-rear direction, and a refrigerant circulating passage holding the refrigerant inlet and outlet headers in communication with each other therethrough;

joining a cap having a refrigerant inlet to one end of the refrigerant inlet header;

joining a cap having a refrigerant outlet to one end of the outlet header;

joining a pipe joint member having a refrigerant inlet portion in the form of a tube and to be in communication with the refrigerant inlet and a refrigerant outlet portion in the form of a tube and to be in communication with the refrigerant outlet to both the caps of the refrigerant inlet header and the refrigerant outlet header;

inserting a constricted end portion of a refrigerant inlet pipe into the refrigerant inlet portion of the pipe joint member and an end portion of a refrigerant outlet pipe into the refrigerant outlet portion of the pipe joint member; and brazing the refrigerant inlet portion and the refrigerant outlet portion of the pipe joint member to the refrigerant inlet pipe and the refrigerant outlet pipe respectively at the same time using a high-frequency heating coil in the form of a spectacle-shaped assembly of two annular portions, with one of the annular portions positioned around the refrigerant inlet portion of the pipe joint member and the other annular portion positioned around the refrigerant outlet portion thereof.

8. The process for fabricating an evaporator according to claim 7, wherein the refrigerant inlet portion is smaller than the refrigerant outlet portion in outside diameter.

9. The process for fabricating an evaporator according to claim 7, wherein one of the caps and the pipe joint member is provided with a positioning lug projecting toward the other one of the caps and the pipe joint member, and the other one of the caps and the pipe joint member is provided with a positioning recess configured to be fitted with the positioning lug.

10. The process for fabricating an evaporator according to claim 7, wherein the caps are in the form of an integral piece.

* * * * *